US011982957B2

(12) United States Patent
Uekawa

(10) Patent No.: US 11,982,957 B2
(45) Date of Patent: May 14, 2024

(54) IMAGE FORMING APPARATUS THAT ADDS A PREDETERMINED IMAGE TO A REGION WITH A VARIABLE WIDTH THAT IS EQUAL TO OR LESS THAN A WIDTH OF A HEAT GENERATING REGION

(71) Applicant: Canon Kabushiki Kaisha, Tokyo (JP)

(72) Inventor: Eiji Uekawa, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/570,614

(22) Filed: Jan. 7, 2022

(65) Prior Publication Data

US 2022/0128936 A1 Apr. 28, 2022

Related U.S. Application Data

(63) Continuation of application No. 16/943,176, filed on Jul. 30, 2020, now Pat. No. 11,256,199.

(30) Foreign Application Priority Data

Jul. 30, 2019 (JP) ................................ 2019-140047

(51) Int. Cl.
*G03G 15/20* (2006.01)
*G03G 15/08* (2006.01)

(52) U.S. Cl.
CPC ..... *G03G 15/2028* (2013.01); *G03G 15/0887* (2013.01)

(58) Field of Classification Search
CPC .................................................. G03G 15/0887
See application file for complete search history.

(56) References Cited

U.S. PATENT DOCUMENTS 9,201,361 B2 12/2015 Fujimori
10,054,882 B2 * 8/2018 Nomura ............ G03G 15/2039

(Continued)

FOREIGN PATENT DOCUMENTS

CN 1658088 A 8/2005
CN 105319917 A 2/2016

(Continued)

OTHER PUBLICATIONS

JP_2014153506_A_T MachineTranslation, Japan, Aug. 2014, Seo.*

(Continued)

*Primary Examiner* — Victor Verbitsky
(74) *Attorney, Agent, or Firm* — Venable LLP

(57) ABSTRACT

An image forming apparatus including: an image forming portion that forms a toner image on a recording material; a fixing portion that has a heater unit including a heater and that fixes the toner image on the recording material, the heater being capable of changing a heat generating region; a control portion that controls the heater; and an image adding portion that adds a predetermined additional image to a desired image, wherein the control portion sets the heat generating region according to a width of the desired image in a direction perpendicular to the conveying direction or a width of the recording material in the direction perpendicular to the conveying direction, and the width of the predetermined additional image in the direction perpendicular to the conveying direction is equal to or less than the width of the heat generating region in the direction perpendicular to the conveying direction.

18 Claims, 17 Drawing Sheets

(56) References Cited

U.S. PATENT DOCUMENTS

| | | | | |
|---|---|---|---|---|
| 10,459,379 | B2 | 10/2019 | Shimura | |
| 2009/0122349 | A1 | 5/2009 | Bala et al. | |
| 2010/0303525 | A1* | 12/2010 | Mitsuoka | G03G 15/2039 399/329 |
| 2013/0287423 | A1 | 10/2013 | Ohba | |
| 2015/0086230 | A1* | 3/2015 | Fujimori | G03G 15/2039 399/69 |
| 2015/0331372 | A1 | 11/2015 | Takagi | |
| 2018/0039213 | A1 | 2/2018 | Endoh | |

FOREIGN PATENT DOCUMENTS

| | | | |
|---|---|---|---|
| JP | 2001103285 | A | 4/2001 |
| JP | 2009042439 | A | 2/2009 |
| JP | 2014059508 | A | 4/2014 |
| JP | 2014-153506 | A1 | 8/2014 |
| JP | 2014153506 | A * | 8/2014 |
| JP | 2015060160 | A | 3/2015 |
| JP | 2015-219417 | A | 12/2015 |
| JP | 2018017906 | A | 2/2018 |
| JP | 2019032356 | A | 2/2019 |

OTHER PUBLICATIONS

Extended European Search Report dated Jan. 28, 2021 in corresponding European Patent Appln. No. 20188047.3.
Japanese Office Action dated May 9, 2023 in counterpart Japanese Patent Appln. No. 2019-140047.
Chinese Office Action dated Nov. 17, 2023 in corresponding Chinese Patent Appln. No. 202010749718.6.

* cited by examiner

IMAGE FORMING APPARATUS THAT ADDS A PREDETERMINED IMAGE TO A REGION WITH A VARIABLE WIDTH THAT IS EQUAL TO OR LESS THAN A WIDTH OF A HEAT GENERATING REGION

CROSS-REFERENCE TO RELATED APPLICATIONS

The present application is a Continuation of U.S. patent application Ser. No. 16/943,176, filed Jul. 30, 2020, which claims the benefit of Japanese Patent Application No. 2019-140047, filed Jul. 30, 2019, the entire disclosures of which are both hereby incorporated by reference herein.

BACKGROUND OF THE INVENTION

Field of the Invention

The present invention relates to an electrophotographic image forming apparatus such as a color copier and a color printer.

Description of the Related Art

In recent years, image forming apparatuses such as color printers and color copiers have become capable of forming high-quality images with improvements in performance. Under the circumstances, it is becoming possible to form images similar to those of bills and other securities, and problems such as counterfeiting of bills and securities and copyright infringement are likely to increase in the future. As a countermeasure to reduce the problems, according to the disclosure of Japanese Patent Application Publication No. 2001-103285, additional information indicating the serial number of the image forming apparatus for example is added to a color image to be printed in a less noticeable manner to the human eye.

Typically, such an additional image including the additional information is added to the entire image. When a dot pattern is added to a color image consisting of yellow, magenta, cyan, and black color components in a less noticeable manner to the human eye, the pattern is usually added only to the yellow component. When for example an image which should be prohibited from being formed or a copy of an image which should be prohibited from being copied is found, the additional images are extracted from these images and restored, so that the apparatuses used to form these images can be identified.

Meanwhile, with improvements in the performance of the image forming apparatus, there is an increasing trend to reduce power consumption as much as possible by supplying necessary power to the image forming apparatus only in necessary timing for printing. Examples of advanced techniques include reducing the power when the image forming apparatus is in sleep mode, shortening sleep transition time, improving the quick starting performance, and reducing the heat capacity of a heating/fixing apparatus.

Japanese Patent Application Publication No. 2014-59508 discloses an exemplary split heating type fixing apparatus in which a heater mounted on the heating/fixing apparatus is divided into a plurality of heat generating blocks in the longitudinal direction for the purpose of further reducing power consumption. Among the plurality of heat generating blocks obtained by longitudinal dividing, only blocks necessary for heating according to the size of a recording material and the image size are selected for partial heating, so that the power consumption may be further reduced.

SUMMARY OF THE INVENTION

A toner image according to the additional image is normally added on the entire surface of a recording material. Since a conventional fixing apparatus heats the entire surface of a recording material, a toner image according to an additional image is surely fixed on the recording material. However, when selective heating is carried out according to the image size using the split type heating/fixing apparatus as disclosed in Japanese Patent Application Publication No. 2014-59508, and an additional image is set on the entire surface of the recording material, the toner image corresponding to the additional image becomes poorly fixed at a non-heating part or in a region where the temperature is lower than the image part. Therefore, it is an object of the present invention to reduce fixing failures in a toner image according to the additional image.

In order to achieve the object described above, an image forming apparatus according to the present invention including:

an image forming portion that forms a toner image on a recording material according to image information about a desired image;

a fixing portion that has a heater unit including a heater and that fixes, onto the recording material, the toner image formed on the recording material, by heat from the heater, the heater being capable of changing a heat generating region in a direction perpendicular to a conveying direction of the recording material;

a control portion that controls the heater; and an image adding portion that adds a predetermined additional image to the desired image, wherein the control portion sets the heat generating region according to a width of the desired image in the direction perpendicular to the conveying direction or a width of the recording material in the direction perpendicular to the conveying direction, and the width of the predetermined additional image added by the image adding portion in the direction perpendicular to the conveying direction is equal to or less than the width of the heat generating region in the direction perpendicular to the conveying direction.

In order to achieve the object described above, an image forming apparatus according to the present invention including:

an image forming portion that forms a toner image on a recording material according to image information about a desired image;

a fixing portion that has a heater unit including a heater that includes a plurality of heat generating blocks divided in a direction perpendicular to a conveying direction of the recording material and that is capable of changing a heat generating region in the direction perpendicular to the conveying direction, the fixing portion fixing the toner image formed on the recording material, by heat from the heater;

a control portion that controls the heater; and an image adding portion that adds a predetermined additional image to the desired image, wherein the control portion sets the heat generating regions according to a width of the desired image in the direction perpendicular to the conveying direction or the width of the recording material in the direction perpendicular to the conveying direction, and the width of the predetermined additional image added by the image adding portion in the direction perpendicular to the conveying direction is equal to or less than the width of the heat generating region in the direction perpendicular to the conveying direction.

According to the present invention, fixing failures in a toner image according to an additional image may be reduced. Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. The dimensions, materials, shapes, and relative positional arrangements of the components in the following description of the embodiments should be changed as appropriate according to the structure of the apparatus to which the invention is applied and various conditions, and the following embodiments are not intended to limit the scope of the invention.

First Embodiment

Structure of Image Forming Apparatus

Figure 1A:
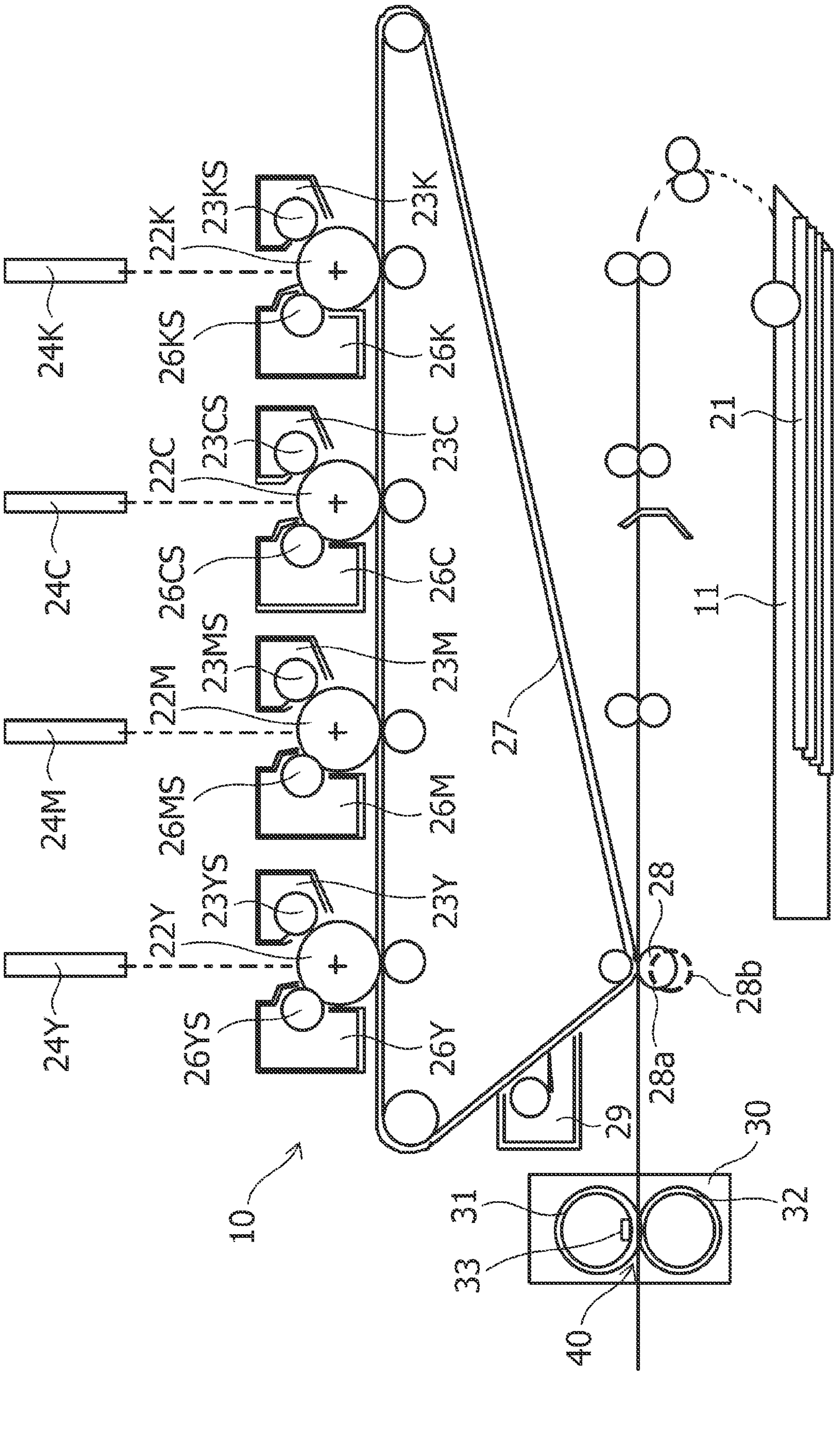
FIG. 1A is a view of the structure of an image forming apparatus.

The structure of an electrophotographic color image forming apparatus (hereinafter referred to as an image forming apparatus) used according to the embodiment will be described. FIG. 1A is a view of a tandem type image forming apparatus including an intermediate transfer member 27. The image forming apparatus includes an image forming unit (image forming portion) 10 and a heating/fixing apparatus (fixing portion) 30 shown in FIG. 1A and an engine controller as an image forming control unit (not shown). The operation of the image forming unit 10 will be described with reference to FIG. 1A. The image forming unit 10 includes a paper feeding unit 21 and photosensitive drums (photosensitive members) 22Y, 22M, 22C, and 22K (hereinafter collectively referred to as the photosensitive drum 22) for stations corresponding to the colors, yellow (Y), magenta (M), cyan (C), and black (K). The image forming unit 10 also includes injection chargers 23Y, 23M, 23C, and 23K as primary charging means (hereinafter collectively referred to as an injector charger 23) and the developing units 26Y, 26M, 26C, and 26K (hereinafter collectively referred to as the developing unit 26) as developing means which stores toner. The image forming unit 10 also includes the intermediate transfer member 27 and a transfer roller 28. The image forming unit 10 includes the injector charger 23 and a developing unit 26 for each station. The image forming unit 10 forms an electrostatic latent image by exposure light turned on the basis of laser exposure time converted by the engine controller, develops the electrostatic latent image, forms single color toner images, and superimposes the single color toner images to form a multicolor toner image. The image forming unit 10 transfers the multicolor toner image on the recording material 11 and forms a multicolor toner image on the recording material 11. The image forming unit 10 forms a toner image on the recording material 11 according to image information about a desired image.

The photosensitive drum 22 includes an aluminum cylinder having its outer periphery coated with an organic photoconductive layer, and rotates as driving force by a drive motor (not shown) is transmitted thereto. The drive motor rotates the photosensitive drum 22 counterclockwise in response to the image forming operation. The injector charger 23 charges the photosensitive drum 22. The injector chargers 23 include sleeves 23YS, 23MS, 23CS, and 23KS. Exposure light to the photosensitive drums 22 are transmitted from the scanner units 24Y, 24M, 24C, and 24K, and an electrostatic latent image is formed by selectively exposing the surfaces of the photosensitive drums 22 to light. Developing unit 26 is provided with sleeves 26YS, 26MS, 26CS, and 26KS. The developing units 26 are each detachably mounted to the image forming apparatus. The intermediate transfer member 27 is in contact with the photosensitive drum 22 and rotates clockwise as the photosensitive drum 22 rotates during image formation, so that a single toner image is transferred. Thereafter, the transfer roller 28, which will be described, contacts the intermediate transfer member 27 to carry the recording material 11 therebetween, and a multicolor toner image on the intermediate transfer member 27 is transferred to the recording material 11. While the multicolor toner image is transferred to the recording material 11, the transfer roller 28 contacts the recording material 11 at the position indicated by the solid line 28*a*, and is parted from the position indicated by the dotted line 28*b* after the printing processing.

The heating/fixing apparatus 30 as a fixing unit (an image heating unit) fuses and fixes the transferred multicolor toner image to the recording material 11 while conveying the recording material 11. The heating/fixing apparatus 30 includes a fixing film 31 for heating the recording material 11 and a pressing roller 32 for pressurizing the recording material 11 into contact with the fixing film 31 as shown in FIG. 1A. The heater unit 36 including a plate-like heater (heating unit) 33 is provided inside the tubular cylindrical fixing film 31 in contact with the recording material 11. The recording material 11 on which the multicolor toner image is formed is conveyed by the fixing film 31 and the pressing roller 32, and heat and pressure are applied, so that the multicolor toner image is fixed to the surface of the recording material 11. In this way, the heating/fixing apparatus 30 fixes the toner image formed in the recording material 11 by the heat from a heater 33 to the recording material 11. The pressing roller 32 forms a fixing nip portion 40 together with the heater unit 36 through the fixing film 31. In this way, the heating/fixing apparatus 30 has the fixing nip portion 40 between the fixing film 31 and the pressing roller 32. Details regarding the longitudinal direction of the heating/fixing apparatus 30 will be described below. After the toner image is fixed, the recording material 11 is discharged to a discharge tray (not shown) by a discharge roller (not shown), and then the image forming operation ends. Cleaning means 29 cleans the toner remaining on the intermediate transfer member 27. The waste toner after transferring the four-color multicolor toner image formed on the intermediate transfer member 27 to the recording material 11 is stored in a cleaner container in the cleaning means 29.

Engine Controller

Figure 1B:
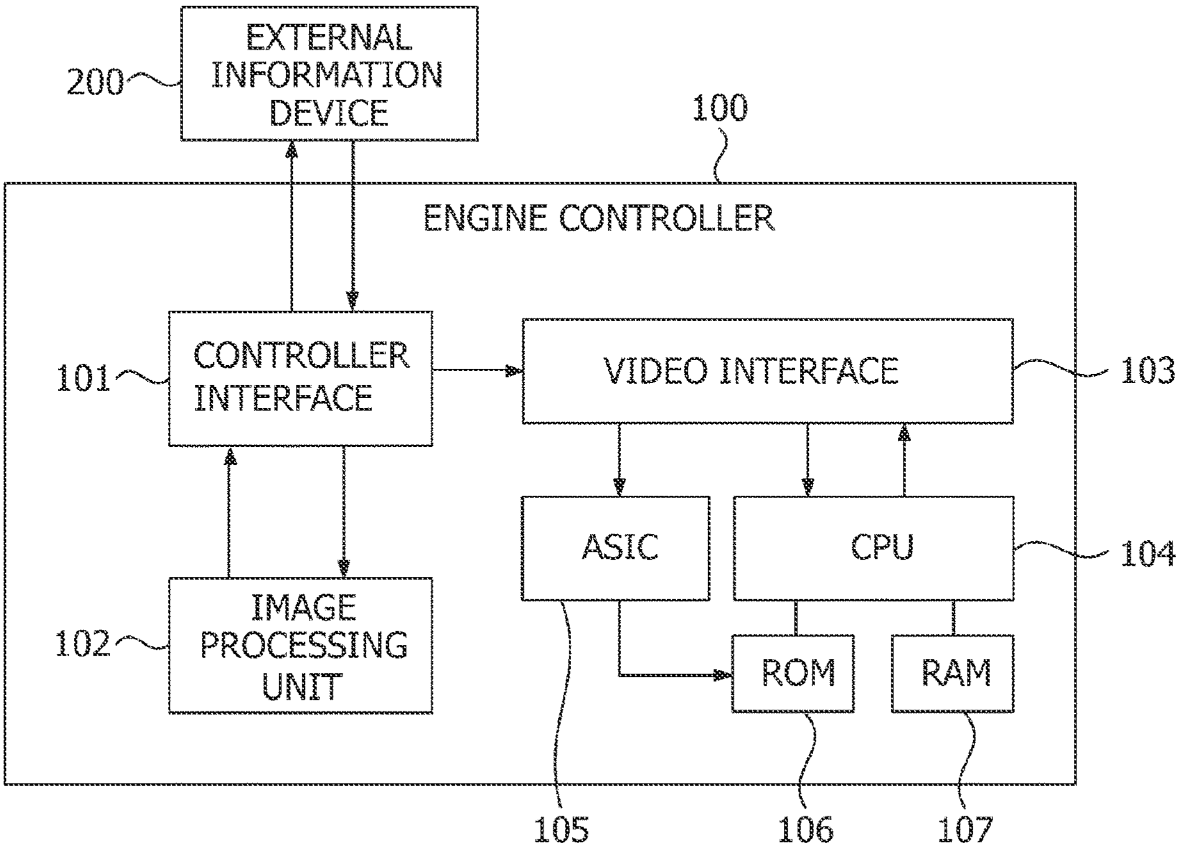
FIG. 1B is a diagram of the configuration of a printer system.

An engine controller according to the first embodiment will be described with reference to FIG. 1B. FIG. 1B is a diagram of the configuration of a printer system (image forming system) according to the first embodiment. An engine controller 100 shown in FIG. 1B is provided in the image forming apparatus which communicates with an external information device (host computer) 200. The external information device 200 may be a server or a personal computer on a network such as the Internet or a local area network (LAN), or a portable information terminal such as a smartphone or a tablet terminal. The engine controller 100 includes a controller interface 101 and an image processing unit 102. The engine controller 100 communicates with the external information device 200 through the controller interface 101. The image processing unit 102 performs bit mapping to the character code or half-toning processing to a grayscale image on the basis of information received from the external information device 200 through the controller interface 101. The engine controller 100 transmits image information obtained from the external information device 200 to a video interface 103 through the controller interface 101. The image information includes information about a target temperature for keeping the heater 33 at a temperature computed by the image processing unit 102 (hereinafter, referred to as the target temperature).

The video interface 103 transmits information about timing for turning on laser scanner 3 to an application specific integrated circuit (ASIC) 105. Meanwhile, the video interface 103 transmits a print mode and image size information to a central processing unit (CPU) 104. The video interface 103 may transmit information about the turning-on timing of the laser scanner 3 to the CPU 104. The CPU 104 is also referred to as a processor. The CPU 104 is not limited to a single processor but may have a multiprocessor configuration. The CPU 104 performs various kinds of control to the engine controller 100 using a ROM 106 or a RAM 107. The engine controller 100 controls the operation, such as starting or stopping printing operation, in response to an instruction given by the user on the external information device 200.

Figure 2:
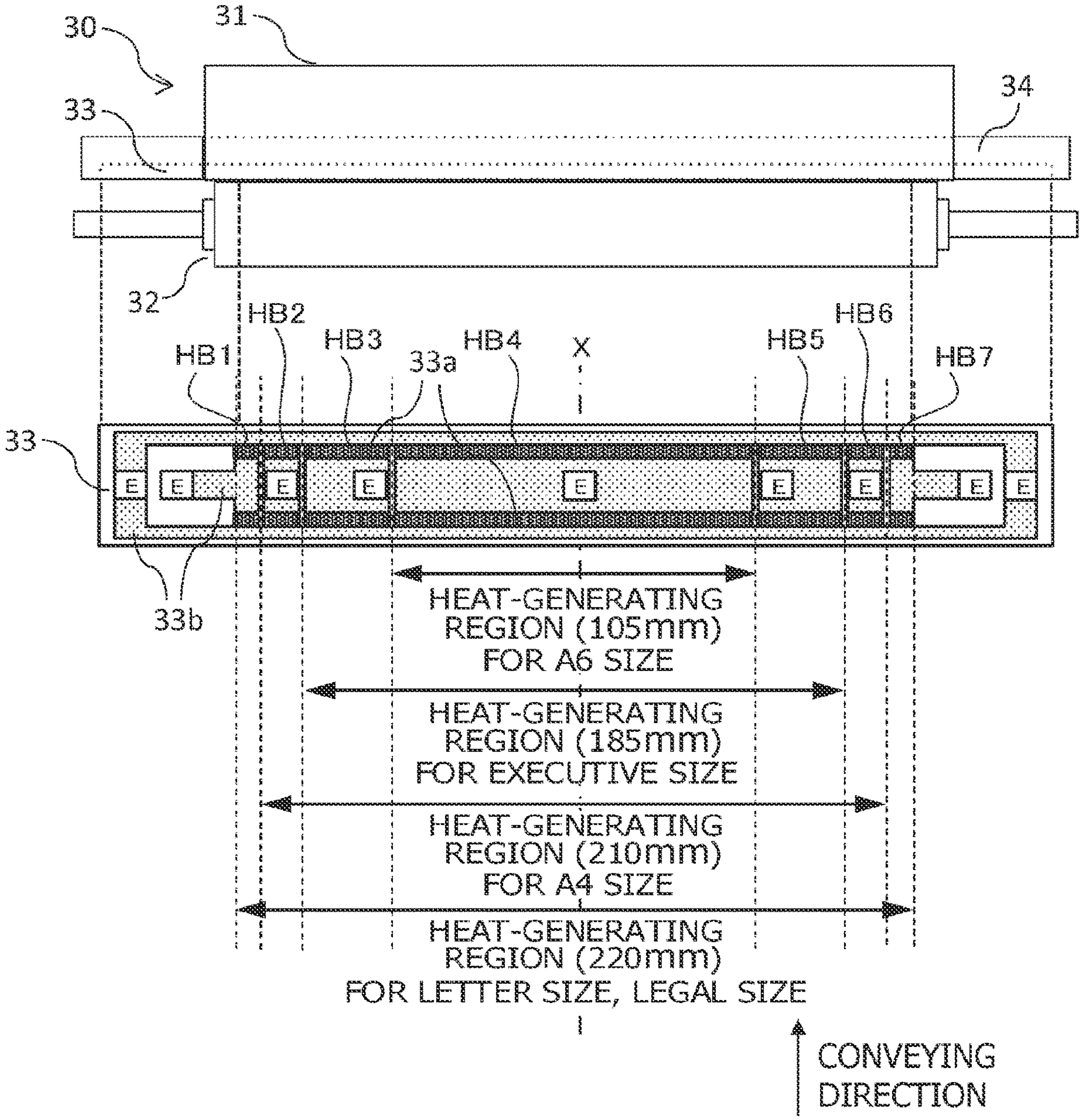
FIG. 2 is a schematic view of a heating/fixing apparatus and a heater.

Next, the structure of the heating/fixing apparatus 30 in the longitudinal direction will be described with reference to FIG. 2. FIG. 2 includes a schematic view of the heating/fixing apparatus 30 viewed from the longitudinal front along with a schematic view of the heater 33 in the heater unit 36 disposed in contact with the inner surface of the fixing film 31 in the longitudinal direction. The heater unit 36 includes a heater 33 and an insulation holder 34. The insulation holder 34 covers the heater 33 and holds the heater 33. The heater unit 36 is in contact with the inner surface of the fixing film 31. The heater 33 of the heater unit 36 has seven heat generating blocks (HB1 to HB7) obtained by dividing the heater longitudinally (in a direction perpendicular to the direction in which the recording material 11 is conveyed). The heat generating block HB4 generates heat and a heat generating region having a width of 105 mm is formed in the heater 33 to heat the recording material 11 having a paper width of, for example, up to A6 paper size (105 mm wide). The heat generating blocks HB3 to HB5 generate heat, and a heat generating region having a width of 185 mm is formed in the heater 33, so that the recording material 11 having a width of up to, for example, Executive size (a width of about 184 mm) or B5 size (a width of 182 mm) is heated. The heat generating blocks HB2 to HB6 generate heat, and a heat generating region having a width of 210 mm is formed in the heater 33, so that the recording material 11 having a width of up to, for example, A4 size (a width of 210 mm) is heated. The heat generating blocks HB1 to HB7 generate heat, and a heat generating region having a width of 220 mm is formed in the heater 33, so that the recording material 11 having a width of, for example, up to Letter size (a width of 216 mm) is heated. In this way, the recording materials 11 having different longitudinal widths are heated by heat from a plurality of heat generating regions having different longitudinal widths.

FIG. 2 shows a conveyance center line X, which is the central conveyance reference of the recording material 11 in a direction perpendicular to the conveying direction of the recording material 11. The recording material 11 is conveyed by aligning the conveyance center line X to the center of the conveying path in a direction perpendicular to the conveying direction of the recording material 11. The number of divisions and the division positions of the heat generating blocks HB1 to HB7 of the heater 33 are not limited thereto, and can be arbitrarily changed in accordance with the characteristics of the heating/fixing apparatus 30 and the specifications of the image forming apparatus.

Each of the heat generating blocks HB1 to HB7 may be independently supplied with power from the electrode E in FIG. 2 and independently heated. In order to independently adjust the temperature of each of the heat generating blocks HB1 to HB7, a temperature sensing element such as a thermistor (not shown) is provided in each of the heat generating blocks HB1 to HB7. The heater 33 includes an electrode E, an energizing heat generating resistive layer 33*a*, and a conductive pattern 33*b*. The heat generating blocks HB1 to HB7 generate heat as power is supplied to the energizing heat generating resistive layer 33*a* through the electrode E and the conductive pattern 33*b*. In this example, the heat generating blocks HB1 to HB7 that are divided can be controlled independently. Alternatively, some of the heat generating blocks HB1 to HB7 may be controlled synchronously in order to simplify the control circuit for driving the heat generating blocks HB1 to HB7. For example, heat generating blocks symmetrical with respect to the conveyance center line X, such as pairs of heat generating blocks HB1 and HB7, HB2 and HB6, and HB3 and HB5 may be each controlled synchronously by one drive circuit. All the pairs of heat generating blocks symmetrical positions may be controlled synchronously, or only one pair of heat generating block HB3 and HB5 may be controlled synchronously. Hereinafter, to drive the heat generating block in such a symmetrical manner will be referred to as "symmetrically driven heat generation."

Figure 3:
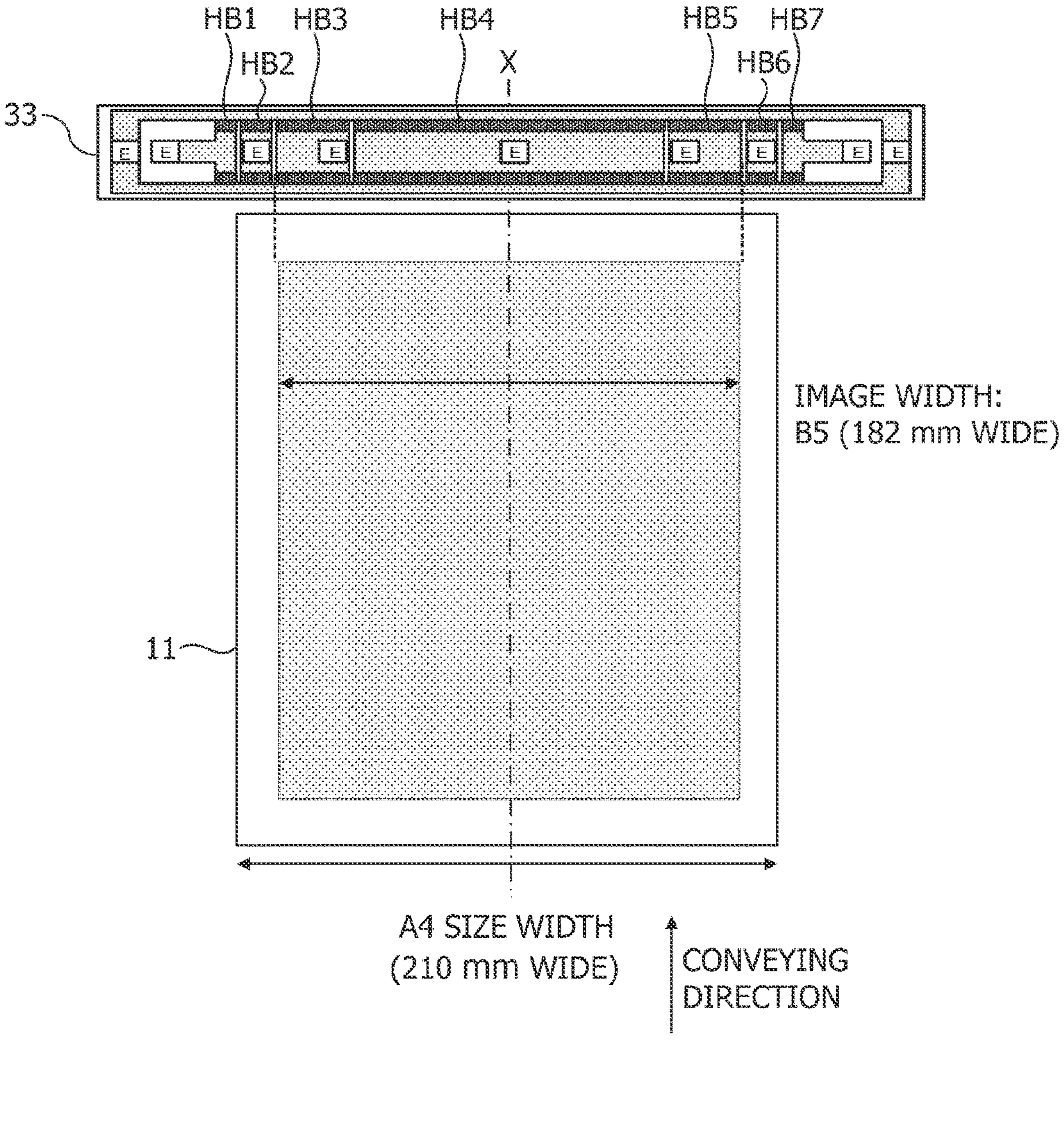
FIG. 3 is a view for illustrating a relation between the heater and an image size.

A temperature sensing signal sensed by a thermistor provided in each of the heat generating block is input to the CPU 104 of the engine controller 100 and converted into temperature information. The engine controller 100 controls the heater 33. The engine controller 100 controls the power supply on the basis of a set temperature (target temperature) for each of the heat generating blocks and a temperature sensed by each of the thermistors, for example, according to PI control, and keeps each of the heat generating blocks at the target temperature. As described above, since each of the heat generating blocks can be independently controlled, the recording material 11 can be heated by selecting and controlling a heat generating block(s) corresponding to the size of the recording material 11 in the widthwise direction (the direction perpendicular to the conveying direction of the recording material 11). The heat generating block(s) corresponding to the size of the image to be printed on the recording material 11 can be selected and controlled, so that the recording material 11 having the toner image formed thereon may be heated by heat from the heater 33 corresponding to the size of the image to be printed on the recording material 11. The engine controller 100 can change the heat generating region of the heater 33 in a direction perpendicular to the direction in which the recording material 11 is conveyed by selectively controlling the turning on of the heat generating blocks HB1 to HB7. The engine controller 100 sets a heat generating region (for example on the basis of the position of the heat generating region) and controls power supplied to the heater 33 such that the heating by the heater 33 is performed on the basis of the set heat generating region. The engine controller 100 is an example of the control portion. For example, as shown in FIG. 3, when an image having the B5 paper size (182 mm wide) is printed on the recording material 11 having the A4 paper size (210 mm wide), only the image part can be selectively heated by selecting and controlling the heat generating blocks HB3, HB4, and HB5. Such control reduces power consumption compared to the case of heating along the entire width of the recording material 11.

Figure 4:
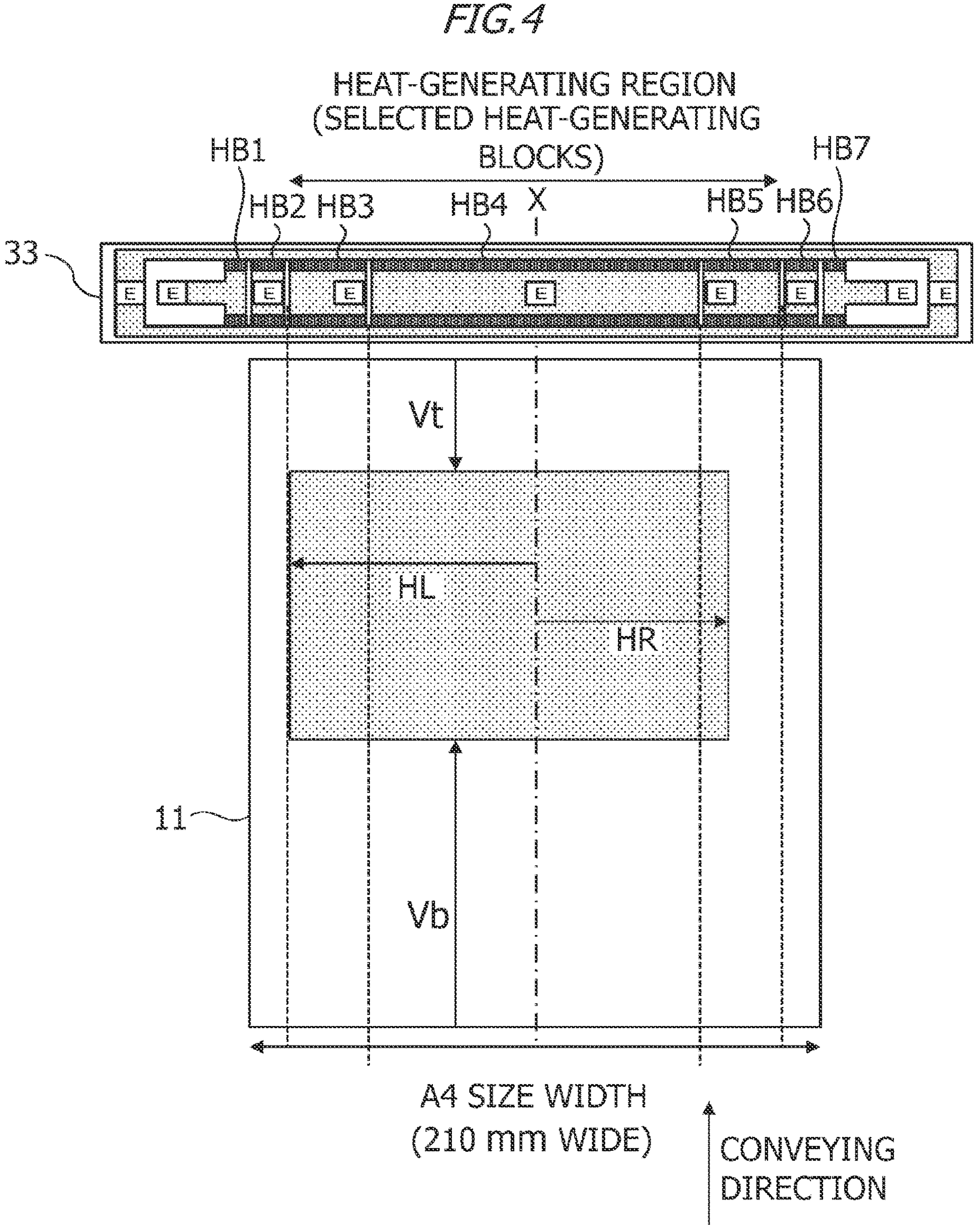
FIG. 4 is a view for illustrating a relation between the heater and an image size.

A method for selecting a heat generating block(s) according to various image sizes will be described with reference to FIG. 4. When the engine controller 100 processes a print job, the engine controller 100 receives size information and the type information about the recording material 11 in addition to the image signal. When the heat generating block(s) of the heater 33 is selected according to the size of the image data corresponding to the toner image formed on the recording material 11, the engine controller 100 receives in advance the area of the toner image formed on the recording material 11 as image size information. The engine controller 100 selects a heat generating block(s) on the basis of image size information.

For example, the engine controller 100 receives distance information representing the positional relation between the image and the recording material 11 when the image is provided on the recording material 11 as image size information (image information). Here, the distance from the front end of the recording material 11 to the front end of the image is Vt, and the distance from the rear end of the recording material 11 to the rear end of the image is Vb. The front end of the recording material 11 is the end of the recording material 11 downstream of the recording material 11 in the conveying direction. The front-most end of the image is the part of the image closest to the front end of the recording material 11. The rear end of the recording material 11 is the end of the recording material 11 upstream of the recording material 11 in the conveying direction. The rear-most end of the image is the part of the image closest to the rear end of the recording material 11. The distance from the conveyance center line X to the rightmost end of the image is HR, and the distance from the conveyance center line X to the leftmost end of the image on the recording material 11 is HL. The rightmost end of the image is the part of the image closest to one end (first end) of opposed ends of the recording material 11 in a direction perpendicular to the conveying direction of the recording material 11. Hereinafter, one end of opposed ends of the recording material 11 in the direction perpendicular to the conveying direction of the recording material 11 will be referred to as the right end of the recording material 11. The leftmost end of the image is the part of the image closest to the other end (second end) of opposed ends of the recording material 11 in a direction perpendicular to the conveying direction of the recording material 11. Hereinafter, the other end of the opposed ends of the recording material 11 in the direction perpendicular to the conveying direction of the recording material 11 will be referred to as the left end of the recording material 11. Hereinafter, the front and rear end information V about the distances Vt and Vb and the left and right end information H about the distances HR and HL are collectively referred to as image size information. The engine controller 100 receives, from the external information device 200, such image size information about each of the recording materials 11 to be passed during a print job before receiving an image signal.

The engine controller 100 calculates the frontmost position (first position) in the image on the basis of the size information and the distance Vt about the recording material 11. The engine controller 100 calculates the position (second position) of the rearmost end of the image on the basis of the size information and the distance Vb about the recording material 11. The engine controller 100 calculates the position (third position) of the rightmost end of the image on the basis of the size information of the recording material 11, the conveyance center line X, and the distance HR. The engine controller 100 calculates the leftmost position (fourth position) of the image on the basis of the size information about the recording material 11, the conveyance center line X, and the distance HL. The engine controller 100 may obtain the respective positions of the frontmost, rearmost, rightmost, and leftmost ends of the image from the external information device 200. The image size information may include the respective positions of the frontmost, rearmost, rightmost, and leftmost ends of the image.

The engine controller 100 sets the heat generating region on the basis of the positions of the rightmost and leftmost ends of the image. In this manner, the engine controller 100 sets the heat generating region according to the width of the image in the direction perpendicular to the conveying direction of the recording material 11. The engine controller 100 sets the heat generating region by selecting the heat generating block(s) necessary for heating among the heat generating blocks obtained by dividing the heater 33. In the example shown in FIG. 4, the heat generating block HB5 corresponding to a position (the position at the rightmost end of the image) which is a distance HR apart from the conveyance center line X is selected. In the example shown in FIG. 4, the heat generating block HB3 corresponding to the position (the position at the left end of the image) which is a distance HL apart from the conveyance center line X is selected, and the heat generating block HB4 sandwiched between the heat generating blocks HB5 and HB3 is selected. In this way, the heat generating blocks HB3 to HB5 are selected during heating and fixing.

According to the timing in which the recording material 11 carrying an unfixed toner image is conveyed to the fixing nip portion 40, the heat generating block is heated until the temperature of the selected heat generating block reaches a target temperature. At this time, the engine controller 100 controls the heat generating blocks so that the temperature of the selected heat generating block reaches the target temperature in the timing of entry of the front end of the recording material 11 into the fixing nip portion 40. Alternatively, the engine controller 100 may control the heat generating block on the basis of the front and rear end information V so that the selected heat generating block reaches the target temperature in the timing in which the front end of the toner image reaches the fixing nip portion 40. The engine controller 100 may also turn off the power supply to the heater 33 after the rear end of the toner image or the rear end of the recording material 11 passes through the fixing nip portion 40 on the basis of the front and rear end information V.

Method for Forming Additional Image

Figure 5:
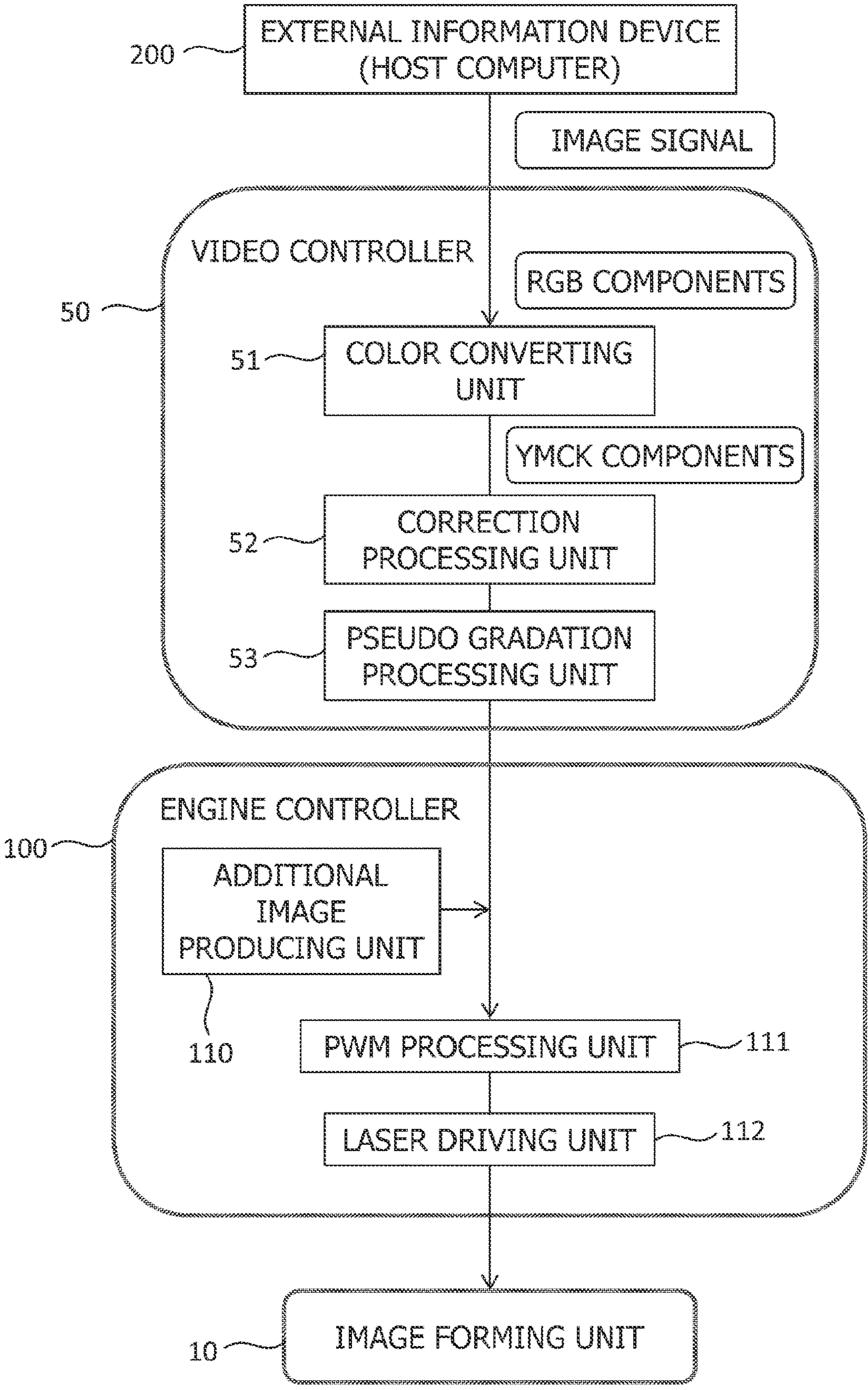
FIG. 5 is a diagram for illustrating the flow of forming an additional image.

Referring to the flow in FIG. 5, a method for forming an additional image having additional information on an image on the recording material 11 will be described. First, an image signal represented by RGB components is transmitted from the external information device 200, such as a host computer, to a video controller 50 in the image forming apparatus. The video controller 50 includes a color converting unit 51, a correction processing unit 52, and a pseudo-gradation processing unit 53. The color converting unit 51 converts an image signal into four color components of CMYK. The correction processing unit 52 performs correction processing for each of the color components of CMYK. The pseudo-gradation processing unit 53 performs pseudo-gradation processing by ordered dithering or error diffusion. The processed image signal is transmitted to the engine controller 100. The engine controller 100 includes, as an image adding portion, an additional image producing unit 110, a PWM processing unit 111, and a laser driving unit 112. The additional image producing unit 110 adds a predetermined additional image to a desired image. The additional image producing unit 110 produces the additional image and superimposes a signal corresponding to the produced additional image on the Y component of the image signal. The PWM processing unit 111 performs pulse width modulation and D/A conversion on the image signal superposed with the signal corresponding to the additional image, and then inputs the image signal superposed with the signal corresponding to the additional image to the laser driving unit 112. The scanner unit of the image forming unit 10 is driven to perform image formation on the basis of the image signal processing, The additional image produced by the additional image producing unit 110 includes the manufacturer's name, the model name, and the model number of the image forming apparatus, unlike the image data transmitted from the external information device 200. The additional image producing unit 110 may encrypt the additional information and superimpose on the image signal with a signal corresponding to the image having the encrypted additional information. Here, an additional image formed with a yellow toner having low visibility will be described as means for identifying the image forming apparatus. However, the type of the additional image is not limited to this. For example, when a printed document is copied using a copier, an image embedded in the original document can be handled as the additional image so that the print can be recognized as a copy. The embedded image includes an image (latent image) desired to be visible by copying such as "copy" or "copy prohibited" and a background image. The latent image may be a pattern such as a mark in addition to a character string. In addition, when the image forming apparatus has the function of adding specific information to a printed object, such as a one-dimensional or two-dimensional bar code, a QR code (registered trademark), and a code or symbol, which is not included in the original document, these images can also be defined as additional images. These additional images are applicable to all of the following embodiments.

Figure 6:
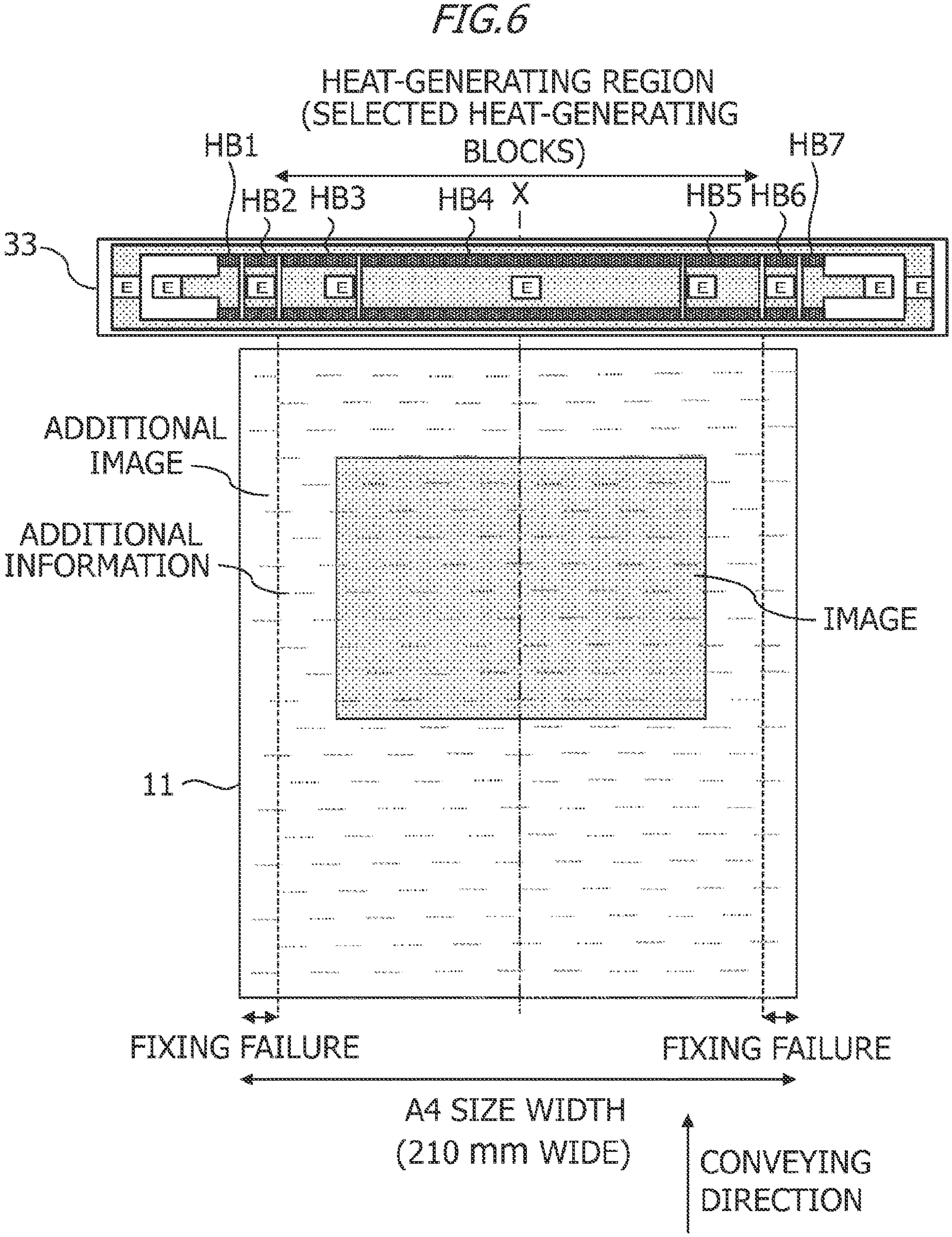
FIG. 6 is a view for illustrating a problem encountered when heating is performed by changing a heat generating region according to the image size.

A problem encountered when a heat generating region is changed depending on the image size for heating will be described with reference to FIG. 6. Here, in FIG. 6, the image is symmetrical with respect to the conveyance center line X, but as in FIG. 4, the same problem is encountered when the image is asymmetrical with respect to the conveyance center line X. When a toner image corresponding to an additional image is formed in the entire area of the printable region on the recording material 11, and there is an unselected heat generating block, a part of the toner image is not heated, and fixing of the toner image fails. Further, the margin in the recording material 11 may be contaminated, and toner stains can build up in the heating/fixing apparatus 30.

Figure 7:
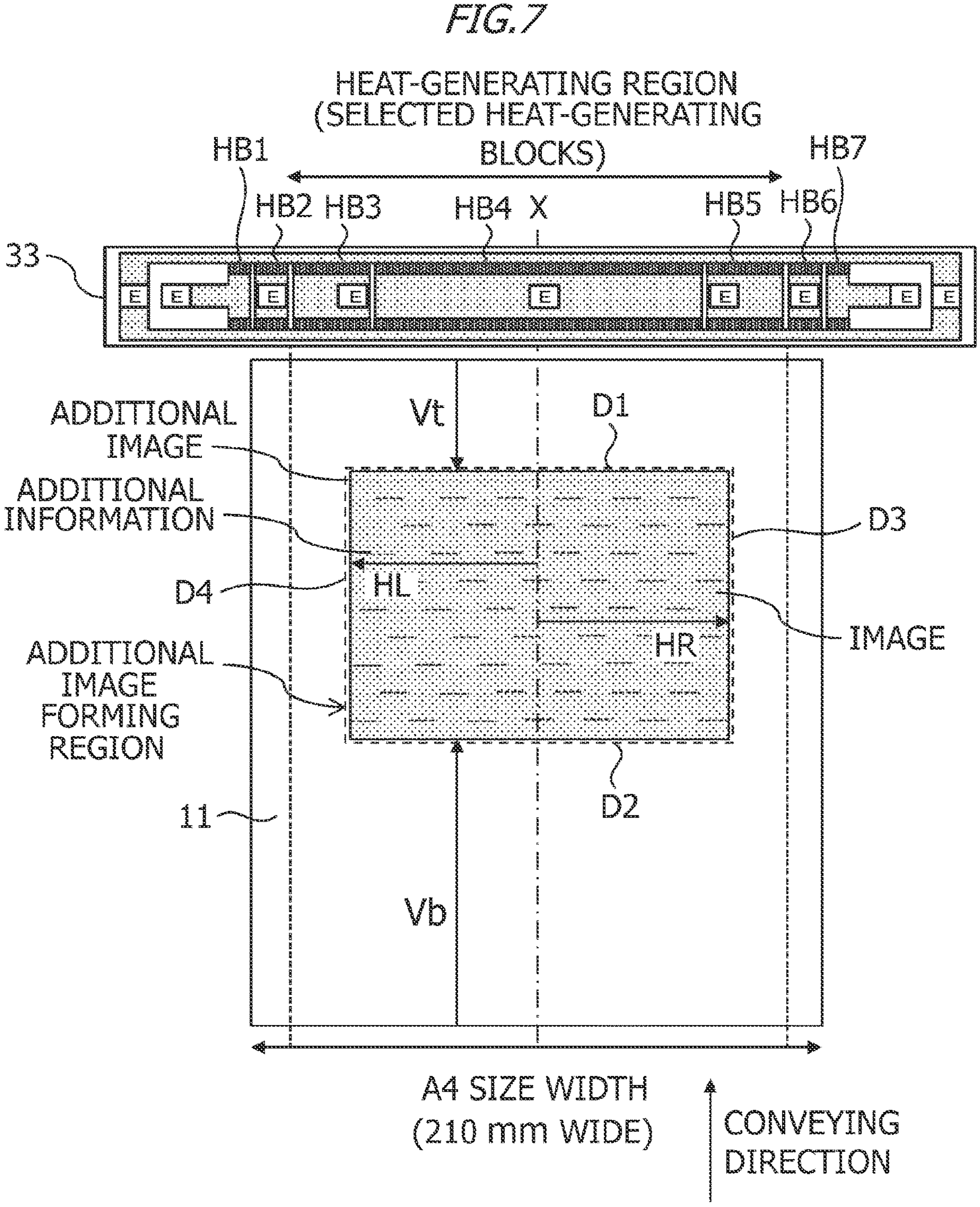
FIG. 7 is a view for illustrating a method for forming an additional image according to a first embodiment of the invention.

A method for forming an additional image according to the first embodiment will be described. In addition to the image signal as image data, image size information about the image to be printed on the recording material 11 is transmitted to the engine controller 100 before the image signal is transmitted. The additional image producing unit 110 of the engine controller 100 produces an additional image for a limited region (hereinafter referred to as the additional image forming region) for forming an additional image to be superimposed on the image signal for example on the basis of the obtained image size information. Specifically, as shown in FIG. 7, the engine controller 100 sets the additional image forming region within a rectangular range determined on the basis of the distances Vt, Vb, HL, and HR obtained as the image size information. The additional image forming region may have any shape such as a circular shape and an elliptical shape other than the rectangular (oblong) shape.

The additional image producing unit 110 may add the predetermined additional image to a region in which the desired image is formed in the conveying direction of the recording material 11. The additional image producing unit 110 may add the predetermined additional image to a region in which the desired image is formed in the direction perpendicular to the conveying direction of the recording material 11. In FIG. 7, a region surrounded by lines D1 to D4 is set on the recording material 11 as an additional image forming region. The line D1 (first line) extends in a direction perpendicular to the conveying direction of the recording material 11 and passes through a position (first position) at the frontmost end of the image. The line D2 (second line) extends in the direction perpendicular to the conveying direction of the recording material 11 and passes through a position (second position) at the rearmost end of the image. The line D3 (third line) extends in the conveying direction of the recording material 11 and passes through a position (the third position) at the rightmost end of the image. The line D4 (fourth line) extends in the conveying direction of the recording material 11 and passes through a position (fourth position) at the leftmost end of the image. The lines D1 to D4 may be straight lines, curves and wave lines, or combinations thereof. The additional image producing unit 110 sets the additional image forming region on the basis of the information about the positions of the frontmost end, the rearmost end, the rightmost end, and the leftmost end in the image, and produces the additional image arranged in the additional image forming region. In FIG. 7, the additional image producing unit 110 superimposes the entire additional image on the entire image and places the additional image in the additional image forming region. A toner image corresponding to the image and the additional image is formed on the recording material 11 by the image forming unit 10. The engine controller 100 sets a heating a region on the basis of the location of the rightmost end of the image and the location of the leftmost end. In this manner, the engine controller 100 sets the heat generating region according to the width of the image in a direction perpendicular to the conveying direction of the recording material 11. The engine controller 100 may also set a heat generating region according to the width of the recording material 11 in the direction perpendicular to the conveying direction of the recording material 11. In FIG. 7, the heat generating regions are set by selecting the heat generating blocks HB3 to HB5, and the toner image on the recording material 11 is subjected to heating and fixing. In FIG. 7, in the direction perpendicular to the conveying direction of the recording material 11, the width of the additional image is smaller than the width of the recording material 11 and smaller than the width of the heat generating region. Therefore, the width of the additional image in the direction perpendicular to the conveying direction of the recording material 11 is not more than the width of the heat generating region in the direction perpendicular to the conveying direction of the recording material 11. The additional image forming region is limited in this way, which makes it possible to surely heat and fix the toner image corresponding to the image (original image) as the image data transmitted from the external information device 200 and the toner image corresponding to the additional image different from the image on the recording material 11. Fixing failures about the toner image corresponding to the additional image may be reduced as compared to the arrangement in FIG. 6.

Application Example of First Embodiment

An application of the first embodiment will be described. In the application of the first embodiment, a small margin may be added to the image size so that the additional image forming region is slightly larger than the region in which the image is formed. In this case, the heat generating block corresponding to the position of the additional image forming region is selected, and the toner image on the recording material 11 is heated and fixed. Alternatively, the margin may be reduced slightly from the image size so that the additional image forming region is slightly smaller than the region in which the image is arranged.

When the image size of the original image is small and the additional image forming region becomes narrower accordingly, a necessary additional image may not be added to the desired image. In such a case, the additional image forming region may be expanded to a specific size. For example, when a region of 5 cm×5 cm is required to add the necessary additional image to the desired image, and the image size of the original image is smaller, the area of the additional image forming region may be increased to the minimum necessary area. In this case, the heat generating block corresponding to the position of the additional image forming region is selected, and the toner image on the recording material 11 is heated and fixed. The minimum necessary area of the additional image forming region is not limited to the above-described area but may be determined as appropriate according to the characteristics of the additional image.

Second Embodiment

Figure 8:
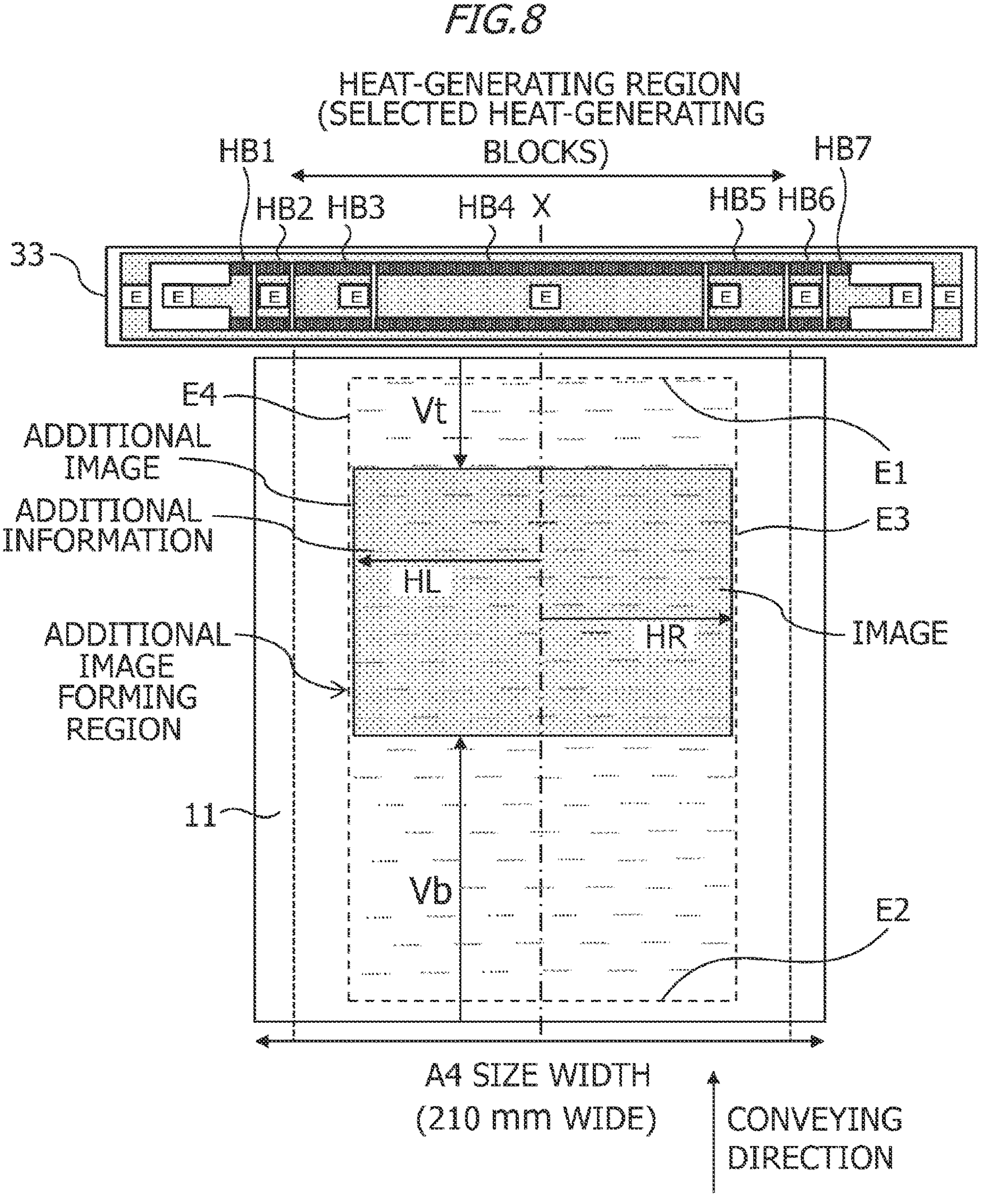
FIG. 8 is a view for illustrating a method for forming an additional image according to a second embodiment of the invention.

A method for forming an additional image according to a second embodiment of the invention will be described with reference to FIG. 8. According to the embodiment, as shown in FIG. 8, an additional image forming region is determined on the basis of the left and right end information H in the image size information and information about the length from the front end to the rear end of the recording material 11, which is related to the conveying direction of the recording material 11. More specifically, the additional image forming region is set within the rectangular range shown by the dotted line of FIG. 8. The additional image forming region may have any shape such as a circular shape and an elliptical shape other than the rectangular (oblong) shape. Due to variations in the sizes and signal timing of various units in the image forming unit 10, the toner image may not be formed near each end of the recording material 11. So that the additional image forming region can be a region in which an image can be created, the positions of the front and rear ends of the recording material 11 defined herein exclude a prescribed area of the margin from the front and rear ends of the recording material 11.

As shown in FIG. 8, when the additional image forming region is set from the front end to the rear end of the recording material 11, the region from the front end to the rear end of the recording material 11 must continue to be heated in order to keep the heat generating block at the target temperature. The region from the front end to the rear end of the recording material 11 continues to be heated, so that fixing failures in the toner image according to the additional image can be reduced.

The additional image producing unit 110 may add the predetermined additional image also to a region other than the region in which the desired image is formed in the conveying direction of the recording material 11. The additional image producing unit 110 may add the predetermined additional image to a region in which the desired image is formed in the direction perpendicular to the conveying direction of the recording material 11. In FIG. 8, the region surrounded by the lines E1 to E4 is set on the recording material 11 as an additional image forming region. The line E1 (first line) extends in the direction perpendicular to the conveying direction of the recording material 11 and passes between the position of the frontmost end of the image (first position) and the position of the frontmost end of the recording material 11. The line E2 (second line) extends in the direction perpendicular to the conveying direction of the recording material 11 and passes between the position at the rearmost end of the image (the second position) and the position at the rearmost end of the recording material 11. The line E3 (third line) extends in the conveying direction of the recording material 11 and passes through the position (third position) at the rightmost end of the image. The line E4 (fourth line) extends in the conveying direction of the recording material 11 and passes through the position (fourth position) at the leftmost end of the image. The lines E1 to E4 may be straight lines, curves and wave lines, or combinations thereof. The additional image producing unit 110 sets the additional image forming region on the basis of the information about the rightmost position and the leftmost position of the image and the information about a prescribed position, and produces the additional image arranged in the additional image forming region. The prescribed position includes an arbitrary position between the position of the frontmost end of the recording material 11 and the position of the frontmost end of the image, and an arbitrary position between the position of the rearmost end of the recording material 11 and the position of the rearmost end of the image. In FIG. 8, the additional image producing unit 110 superimposes a part of the additional image on the entire image and arranges the additional image in the additional image forming region. A toner image corresponding to the image and the additional image is formed on the recording material 11 by the image forming unit 10. The engine controller 100 sets the heat generating region on the basis of the location of the rightmost end of the image and the location of the leftmost end. In this manner, the engine controller 100 sets the heat generating region according to the width of the image in a direction perpendicular to the conveying direction of the recording material 11. The engine controller 100 may also set a heat generating region according to the width of the recording material 11 in the direction perpendicular to the conveying direction of the recording material 11. In FIG. 8, the heat generating regions are set by selecting the heat generating blocks HB3 to HB5, and the toner image is heated and fixed on the recording material 11. In FIG. 8, the width of the additional image is smaller than the width of the recording material 11, and smaller than the width of the heat generating region in the direction perpendicular to the conveying direction of the recording material 11.

By expanding the additional image forming region as in the second embodiment, the toner image corresponding to the additional image can be formed in the recording material 11 in a wider range than the first embodiment. As a result, the additional image can be more readable. When the additional image is formed with yellow toner, the printing percentage of the image is high, and the image is formed with a color close to yellow, the additional image formed only within the image size of the original image is buried and becomes unnoticeable in the image as in the first embodiment. As a result, it may become difficult to determine the additional image. According to the second embodiment, since the area of the additional image forming region is larger than the area of the area in which the image is arranged, an additional image can be formed in a larger area. As a result, the additional image can be more readable.

Third Embodiment

A method for forming an additional image according to a third embodiment of the invention will be described. According to the first and second embodiments, the additional image is formed the region determined on the basis of the left and right end information H. According to the second embodiment, when the entire area from the front end to the rear end of the recording material 11 includes an image with a color range close to yellow, most of the additional image is buried in the image, and therefore, it may become difficult to determine the additional image.

Figure 9:
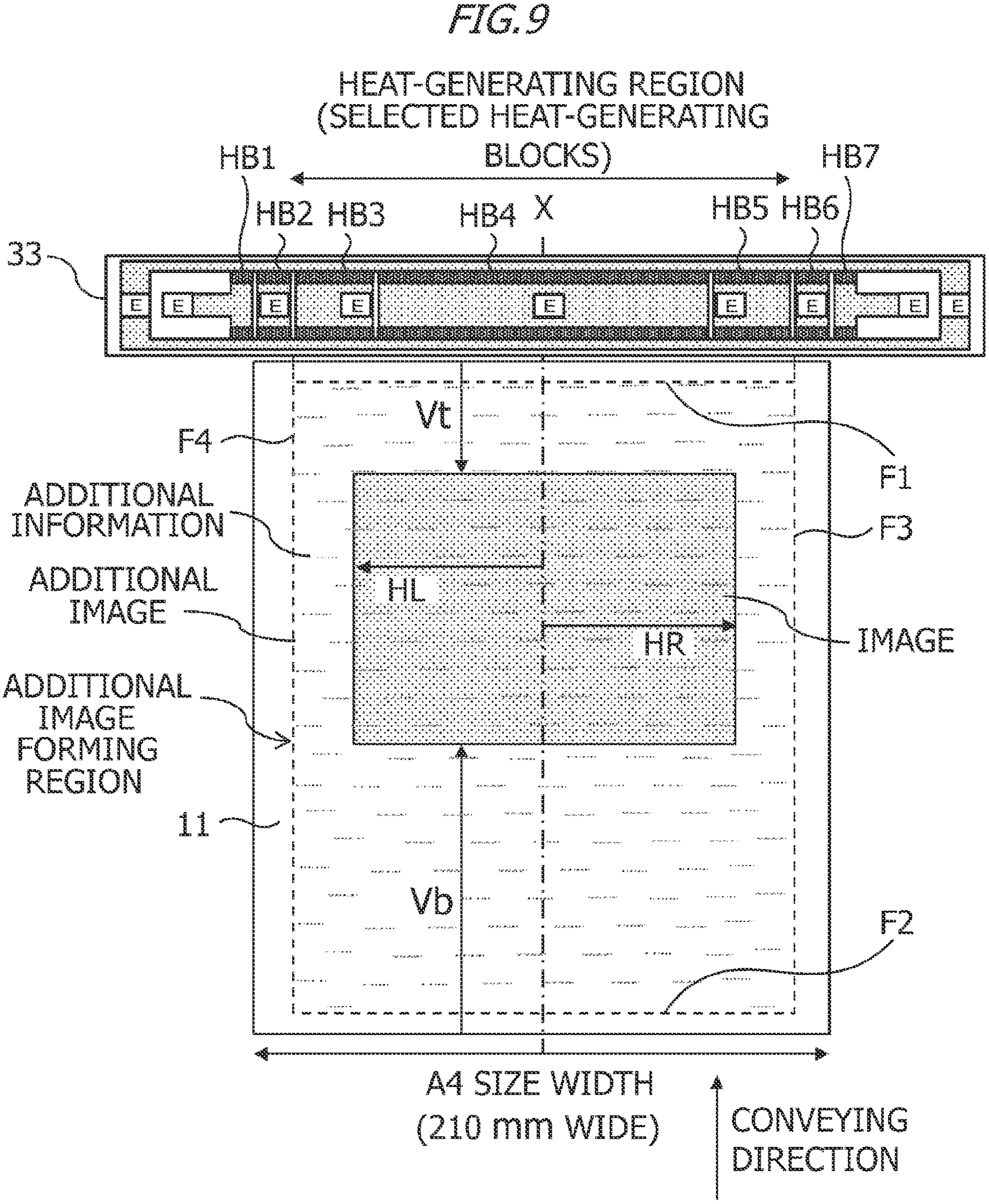
FIG. 9 is a view for illustrating a method for forming an additional image according to a third embodiment of the invention.

FIG. 9 shows the recording material 11, the image on the recording material 11, and the heater 33 and how they are divided in position relative to each other. As for the image size shown in FIG. 9, the rightmost and leftmost ends of the image are located within the range from the width of A6 paper size and less than the width of B5 size. When such an image is heated to fix, the heat generating blocks HB3, HB4, and HB5 are selected. The heat generating blocks HB3, HB4, and HB5 are controlled so that the temperature of the heat generating region of the heater 33 formed by the heating of the heat generating blocks HB3, HB4, and HB5 becomes the target temperature. Stated differently, the heat generating region of the heater 33 including the heat generating blocks HB3, HB4, and HB5 can fix an unfixed toner image.

Therefore, according to the third embodiment, an additional image is produced according to the selected heat generating blocks. In the example shown in FIG. 9, the heat generating blocks HB3 to HB5 are selected depending on the location of the rightmost and leftmost ends of the image. Then, on the basis of the heat generating region formed by heat generation by the heat generating blocks HB3, HB4, and HB5, the positions of the rightmost end and the leftmost end of the additional image forming region are determined.

The additional image producing unit 110 may add the predetermined additional image also to a region other than the region in which the desired image is formed in the direction perpendicular to the conveying direction of the recording material 11. The additional image producing unit 110 may add the predetermined additional image so that the predetermined additional image is symmetrical with respect to a conveyance center (conveyance center line X) of the recording material 11 in the direction perpendicular to the conveying direction of the recording material 11. In FIG. 9, the region surrounded by lines F1 to F4 is set on the recording material 11 as an additional image forming region. The line F1 (first line) extends in the direction perpendicular to the conveying direction of the recording material 11 and passes between the position of the frontmost end of the image (first position) and the position of the front end of the recording material 11. The line F2 (second line) extends in the direction perpendicular to the conveying direction of the recording material 11 and passes between the position at the rearmost end of the image (second position) and the position at the rear end of the recording material 11. The line F3 (third line) extends in the conveying direction of the recording material 11 and passes between the position at the rightmost end of the image (third position) and the position at the right end of the recording material 11. The line F4 (fourth line) extends in the conveying direction of the recording material 11 and passes between the position at the leftmost end of the image (fourth position) and the position at the left end of the recording material 11. The lines F1 to F4 may be straight lines, curves and wave lines, or combinations thereof. The line F1 may pass through the frontmost end of the image similarly to the line D1 in FIG. 7 according to the first embodiment. The line F2 may pass through the position at the rearmost end of the image similarly to the line D2 in FIG. 7 according to the first embodiment.

The engine controller 100 sets the heat generating region on the basis of the positions of the rightmost end and the leftmost end in the image. In this manner, the engine controller 100 sets the heat generating region according to the width of the image in the direction perpendicular to the conveying direction of the recording material 11. The engine controller 100 may also set the heat generating region according to the width of the recording material 11 in the direction perpendicular to the conveying direction of the recording material 11. The additional image producing unit 110 sets the additional image forming region on the basis of information about the width of the heat generating region (the position at opposed ends of the heat generating region) and information about the prescribed position, and produces the additional image arranged in the additional image forming region. The prescribed position includes an arbitrary position between the position of the front end of the recording material 11 and the position of the frontmost end of the image, and an arbitrary position between the position of the rear end of the recording material 11 and the position of the rearmost end of the image. In FIG. 9, the additional image producing unit 110 superimposes a part of the additional image on the entire image and arranges the additional image in the additional image forming region. A toner image corresponding to the image and the additional image is formed on the recording material 11 by the image forming unit 10. In FIG. 9, the heat generating region is set by selecting the heat generating blocks HB3 to HB5, and the toner image is heated and fixed on the recording material 11. In FIG. 9, the width of the additional image is smaller than the width of the recording material 11 and is the same as the width of the heat generating region in the direction perpendicular to the conveying direction of the recording material 11. Therefore, the width of the additional image in the direction perpendicular to the conveying direction of the recording material 11 is not more than the width of the heat generating region in the direction perpendicular to the conveying direction of the recording material 11.

The distance from the conveyance center line X to one end of the heat generating region (the first distance) on the right end side of the recording material 11 (first end side) is the same as the distance from the conveyance center line X to the rightmost end of the additional image forming region (the second distance) on the right end of the recording material 11 (the part closest to the right end of the recording material 11 in the line F3). One end of the heat generating region is one of opposed ends of the heat generating region. The distance from the conveyance center line X to the other end of the heat generating region (the third distance) on the left end of the recording material 11 (the second end side) is the same as the distance from the conveyance center line X to the left end of the additional image forming region (the part closest to the left end of the recording material 11 in line F4) (the fourth distance). The other end of the heat generating region is the other end of the heat generating region. Therefore, when the recording material 11 passes through the fixing nip portion 40, both ends of the toner image formed in the recording material 11 in the longitudinal direction (the direction perpendicular to the conveying direction of the recording material 11) and both ends of the heat generating region overlap in the normal direction of the paper surface of the recording material 11. Therefore, it is possible to firmly heat and fix the toner image corresponding to the additional image onto the recording material 11. In FIG. 9, since the additional image forming region is symmetrical with respect to the conveyance center line X, the distance from the conveyance center line X to the rightmost end of the additional image forming region (the second distance) and the distance from the conveyance center line X to the leftmost end of the additional image forming region (the fourth distance) are the same. The distance from the conveyance center line X to one end of the heat generating region of the heater 33 at the right end of the recording material 11 (the first distance) is the same as the distance from the conveyance center line X to the other end of the heat generating region of the heater 33 at the left end of the recording material 11 (the third distance).

Figure 10:
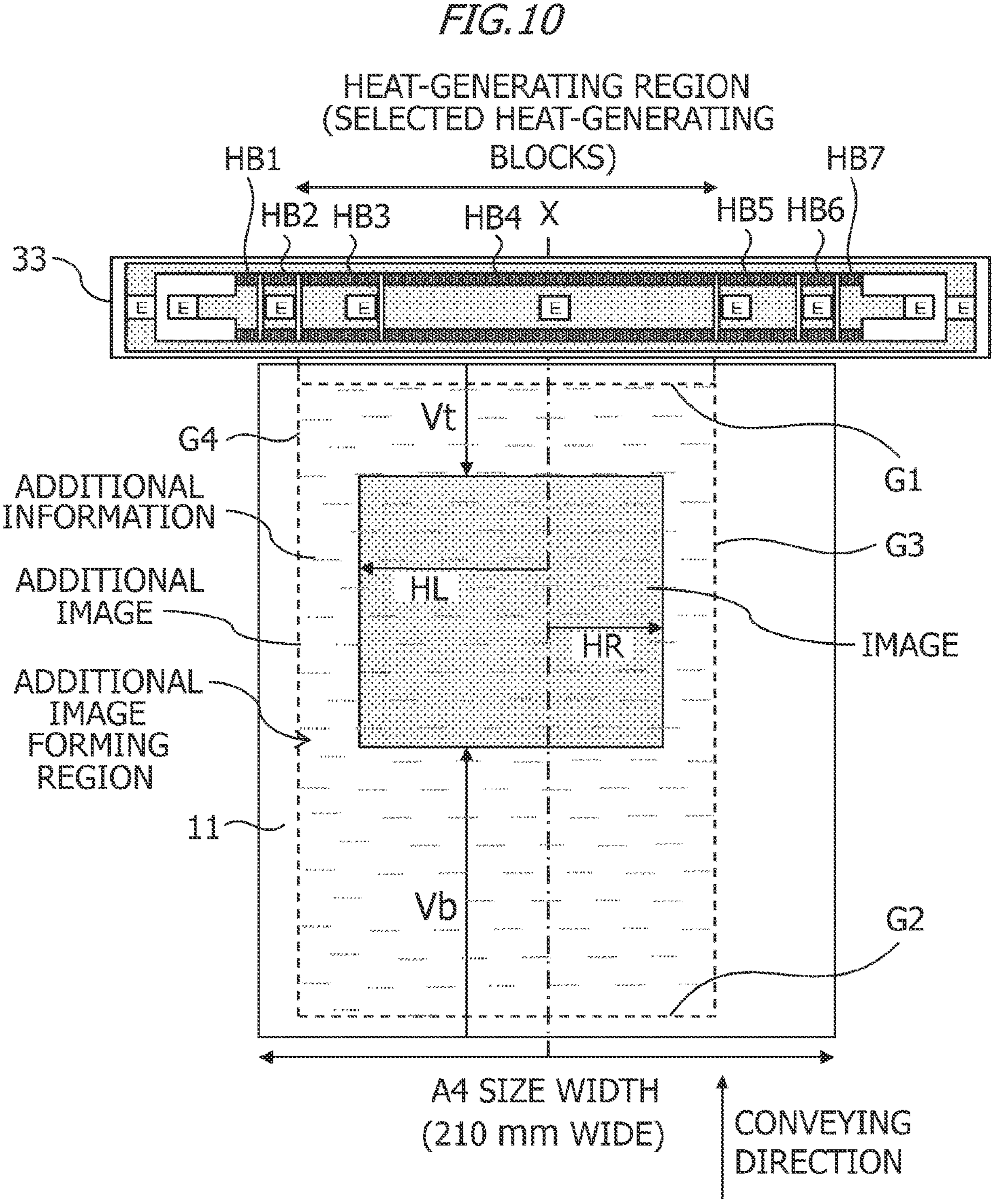
FIG. 10 is a view for illustrating the method for forming an additional image according to the third embodiment.

In addition, if the image is biased either laterally or laterally with respect to the conveyance center line X, the additional image forming region may be biased either laterally or laterally with respect to the conveyance center line X. FIG. 10 shows an example in which the additional image forming region is shifted to the left end of the recording material 11 relative to the conveyance center line X. In the case of FIG. 10, the heat generating blocks HB3 and HB4 are selected according to the right and left extreme positions of the image. Then, the right and left ends of the additional image forming region are determined on the basis of the heat generating region of the heater 33 formed by the heating of the heat generating blocks HB3 and HB4.

The additional image producing unit 110 may add the predetermined additional image also to a region other than the region in which the desired image is formed in the direction perpendicular to the conveying direction of the recording material 11. In FIG. 10, a region surrounded by lines G1 to G4 is set on the recording material 11 as an additional image forming region. The line G1 (first line) extends in the direction perpendicular to the conveying direction of the recording material 11 and passes between the position at the frontmost end of the image (first position) and the position at the frontmost end of the recording material 11. The line G2 (second line) extends in a direction perpendicular to the conveying direction of the recording material 11 and passes between the position at the rear end of the image (second position) and the position at the rear end of the recording material 11. The line G3 (the third line) extends in the conveying direction of the recording material 11 and passes between the position of the rightmost end of the image and the position of the right end of the recording material 11. The line G4 (fourth line) extends in the conveying direction of the recording material 11 and passes between the position at the left end of the image and the position at the left end of the recording material 11. The lines G1 to G4 may be straight lines, curves and wave lines, or combinations thereof. The line G1 may pass through the frontmost end of the image, as in line D1 of FIG. 7 of the first embodiment. The line G2 may pass through the position at the end of the image, as in line D2 of FIG. 7 of the first embodiment. The setting of the heat generating region and the generation of the additional image in FIG. 10 are the same as those in FIG. 9. In FIG. 10, the additional image producing unit 110 superimposes a portion of the additional image on the whole of the image and disposes the additional image in the additional image forming region.

The distance (the first distance) from the conveyance center line X to one end of the heat generating region of the heater 33 at the right end of the recording material 11 is the same as the distance (the second distance) from the conveyance center line X to the rightmost end (at the right end of the recording material 11 at the line G3) of the additional image forming region. The distance from the conveyance center line X to the other end of the heat generating region of the heater 33 at the left end of the recording material 11 (the third distance) is the same as the distance from the conveyance center line X to the left end of the additional image forming region (the part closest to the left end of the recording material 11 in line G4) (the fourth distance). Therefore, when the recording material 11 passes through the fixing nip portion 40, both ends of the toner image formed on the recording material 11 in the longitudinal direction and both ends of the heat generating region overlap in the normal direction to the sheet surface of the recording material 11. Therefore, the toner image corresponding to the additional image can be surely heated and fixed to the recording material 11. In FIG. 10, since the additional image forming region is asymmetrical with respect to the conveyance center line X, the distance from the conveyance center line X to the rightmost end of the additional image forming region (the second distance) and the distance from the conveyance center line X to the leftmost end of the additional image forming region (the fourth distance) are different. The distance from the conveyance center line X to one end of the heat generating region of the heater 33 at the right end of the recording material 11 is different from the distance from the conveyance center line X to the other end of the heat generating region of the heater 33 at the left end of the recording material 11.

In FIG. 10, the width of the additional image is smaller than the width of the recording material 11 and is the same as the width of the heat generating region in the direction perpendicular to the conveying direction of the recording material 11. The additional image forming region according to the third embodiment is larger than the additional image forming region according to the second embodiment, and the area of the additional image forming region according to the third embodiment is larger than the area of the additional image forming region according to the second embodiment. As a result, the additional image can be even more readable.

Fourth Embodiment

A method for forming an additional image according to a fourth embodiment of the invention will be described. As shown in FIG. 10, according to the third embodiment, when an image is shifted to the right or left from the conveyance center line X, the width of the heat generating region of the heater 33 in the direction perpendicular to the conveying direction of the recording material 11 (hereinafter, referred to as the longitudinal width of the heat generating region) is asymmetrical with respect to the conveyance center line X. As shown in FIG. 10, according to the third embodiment, the heat generating blocks HB3 and HB4 are selected, and the heat generating blocks HB3 and HB4 are controlled so that the temperature of the heat generating blocks HB3 and HB4 reaches a target temperature.

Here, when the recording material 11 continues to be heated by a heat generating region asymmetrical to the conveyance center line X, and for example a thin-walled fixing film 31 is used as the fixing member, the fixing film 31 is kept to travel excessively on the right or left. This is because the amount of expansion of the pressing roller 32 by heating varies between the right and the left, and the viscosity and lubricity of a lubricant interposed between the heater 33 and the fixing film 31 differ between the right and the left. When the apparatus continues to be used under such conditions, deflection wear of the end surface of the fixing film 31 may locally wear or wear of the inner surface of the fixing film 31 is promoted, so that the recording material 11 may be conveyed obliquely or wrinkled and the conveying performance may be affected.

Figure 11:
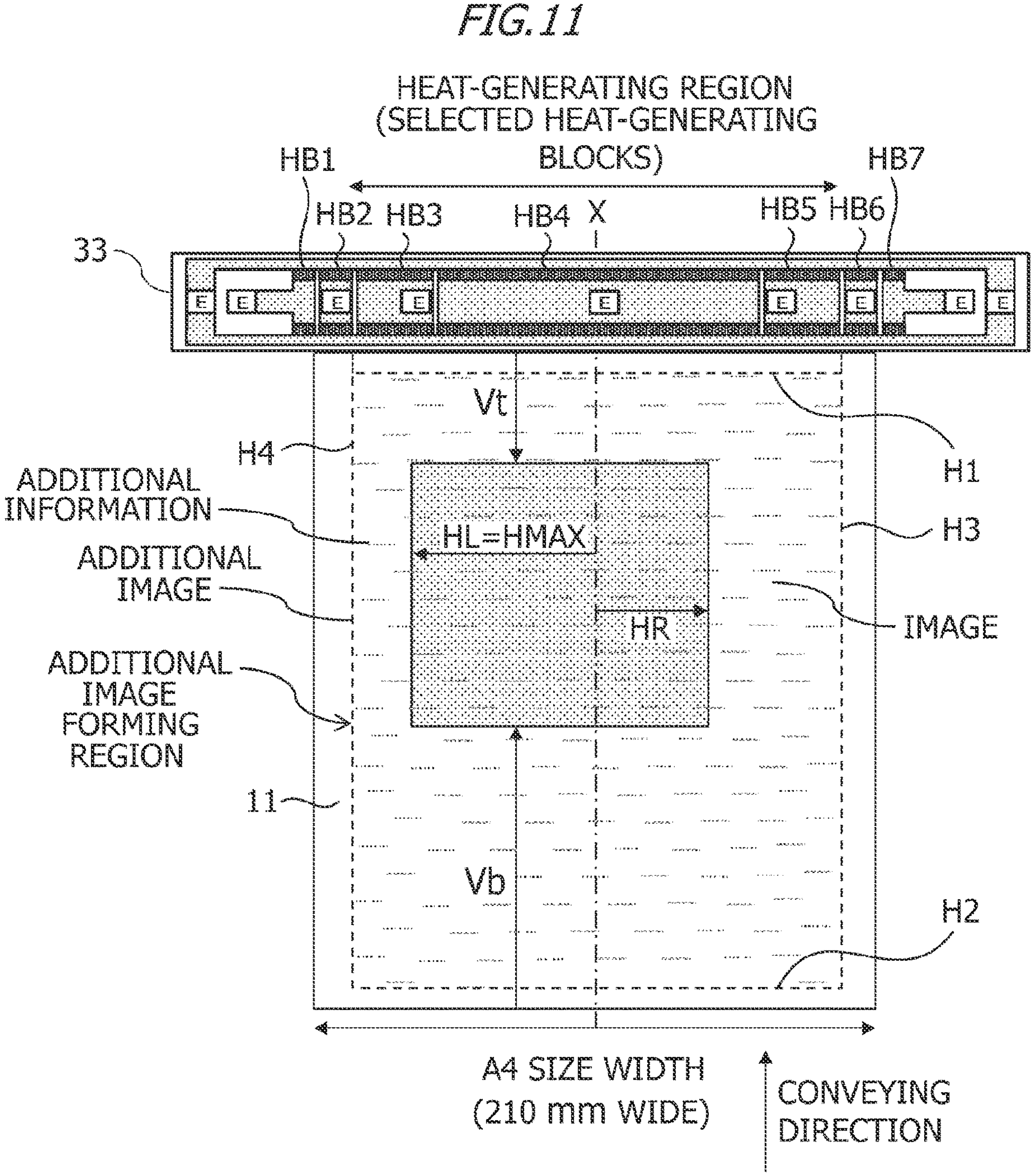
FIG. 11 is a view for illustrating a method for forming an additional image according to a fourth embodiment of the invention.

Therefore, according to the fourth embodiment, as shown in FIG. 11, the distance which is longer from the conveyance center line X between the distances HR and HL included in the left and right end information H of the image size information is set as the distance Hmax. The engine controller 100 sets a heat generating region on the basis of the position which is further from the conveyance center line X between the position of the rightmost end of the image and the position of the leftmost end of the image (the position of the leftmost end of the image in FIG. 11). For example, the engine controller 100 calculates the leftmost position of the image on the basis of the size information about the recording material 11, the conveyance center line X, and the distance Hmax. In the example shown in FIG. 11, the heat generating blocks HB3 and HB5 corresponding to the positions far from the right and left ends of the recording material 11 and the heat generating block HB4 between the heat generating block HB3 and the heat generating block HB5 are selected for the distance Hmax from the conveyance center line X. In this manner, the heat generating blocks HB3 to HB5 are selected so that the longitudinal width of the heat generating region is symmetrical with respect to the conveyance center line X.

The additional image producing unit 110 may add the predetermined additional image also to a region other than the region in which the desired image is formed in the direction perpendicular to the conveying direction of the recording material 11. The additional image producing unit 110 may add the predetermined additional image so that the predetermined additional image is symmetrical with respect to a conveyance center (conveyance center line X) of the recording material 11 in the direction perpendicular to the conveying direction of the recording material 11. In FIG. 11, the region surrounded by lines H1 to H4 is set on the recording material 11 as an additional image forming region. The line H1 (first line) extends in the direction perpendicular to the conveying direction of the recording material 11 and passes between the position of the frontmost end of the image (first position) and the position of the front end of the recording material 11. The line H2 (second line) extends in the direction perpendicular to the conveying direction of the recording material 11 and passes between the position of the rearmost end of the image (second position) and the position of the rear end of the recording material 11. The line H3 extends in the conveying direction of the recording material 11 and passes between the position at the rightmost end of the image (the third position) and the position at the right end of the recording material 11. The line H4 extends in the conveying direction of the recording material 11 and passes between the position at the left end of the image (the fourth position) and the position at the left end of the recording material 11. Lines H1 to H4 may be straight lines, curves and wave lines, or combinations thereof. Line H1 may pass through the frontmost end of the image, as in line D1 of FIG. 7 of the first embodiment. The line H2 may pass through the position at the end of the image, as in line D2 of FIG. 7 of the first embodiment. In the case of FIG. 11, the location at the rightmost end of the image is less distant from the conveyance center line X than the location at the leftmost end of the image. The generation of the additional image in FIG. 11 is the same as that in FIG. 9 of the third embodiment. In FIG. 11, the additional image producing unit 110 superimposes a portion of the additional image on the whole of the image and disposes the additional image in the additional image forming region. The distance from the conveyance center line X of FIG. 11 to one end or the other end of the heat generating region, the distance from the conveyance center line X to the right end or the left end of the additional image forming region is the same as that of FIG. 9 of the third embodiment. In FIG. 11, in a direction perpendicular to the conveying direction of the recording material 11, the width of the additional image is smaller than the width of the recording material 11 and is the same as the width of the heat generating region.

In this way, when the image is shifted to the light or left from the conveyance center line X, the heat generating block is selected so that the longitudinal width of the heat generating region is symmetrical with respect to the conveyance center line X. The additional image forming region is enlarged corresponding to the longitudinal width of the heat generating region, so that the toner image corresponding to the additional image can be formed in a larger region of the recording material 11. As a result, the additional image can be even more readable. In addition, the stable runnability of the fixing film 31 can be obtained without compromising the transportability of the recording material 11.

According to the above-described embodiments, the heat generating blocks can be controlled independently. According to this embodiment, as described in connection with the method for driving the heater 33, some of the heat generating blocks are driven synchronously (symmetrically driven heat generation) so that the longitudinal width of the heat generating region is arranged symmetrical with respect to the conveyance center line X. In this way, as in the embodiment, the longitudinal width of the heat generating region is symmetrical with respect to the conveyance center line X, when the image is shifted to the right or left with respect to the conveyance center line X. Specifically, the engine controller 100 determines the positions of the rightmost and leftmost ends of the additional image forming region on the basis of the heat generating region, whereby the additional image forming region can be enlarged. The aforementioned "symmetrically driven heat generation" is also applicable to the method for forming the additional image described in connection with the first to third embodiments.

Fifth Embodiment

Figure 12:
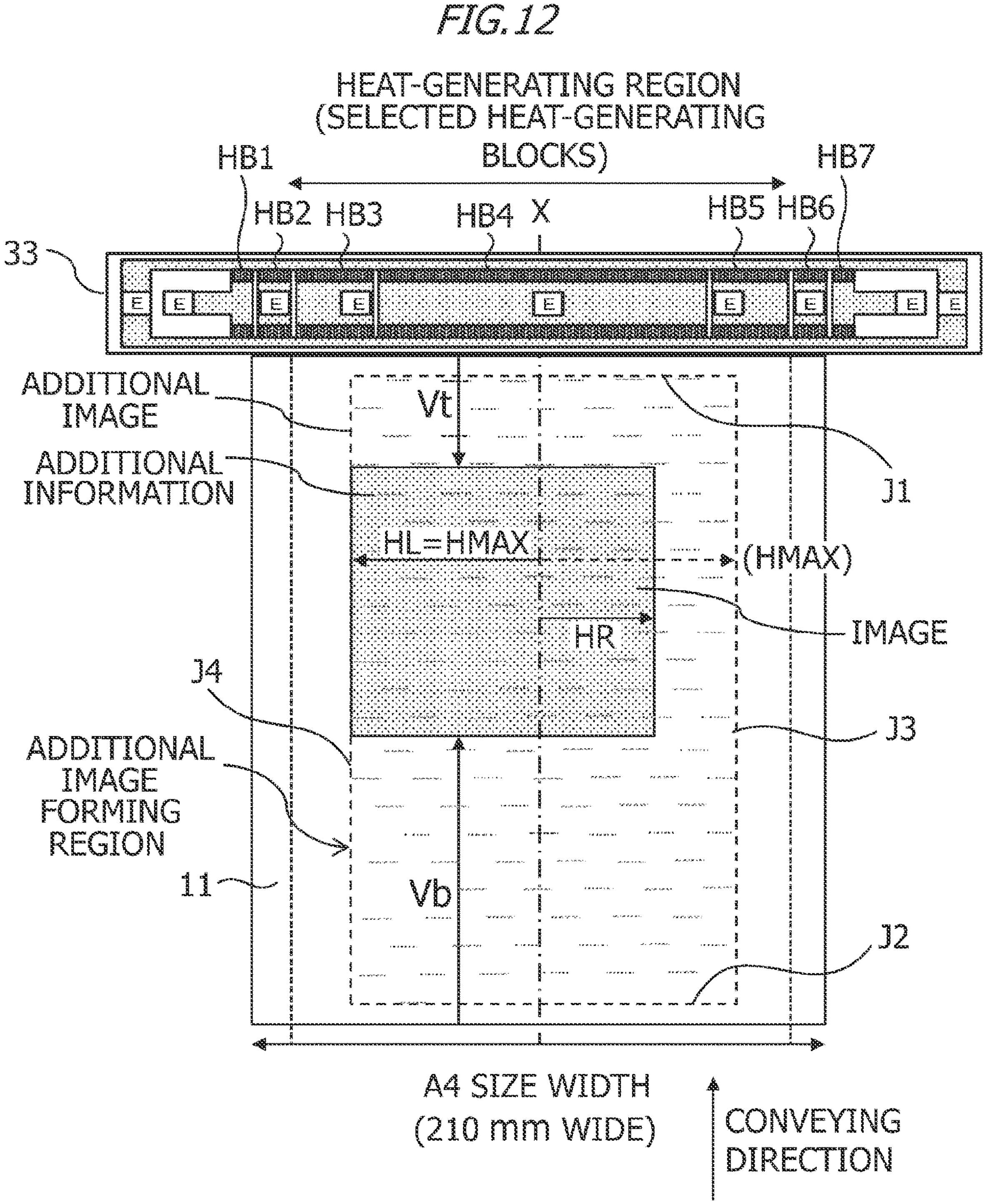
FIG. 12 is a view for illustrating a method for forming an additional image according to a fifth embodiment of the invention.

A method for forming an additional image according to a fifth embodiment of the invention will be described with reference to FIG. 12. The embodiment is an application form of the first and second embodiments. A method for forming an additional image which is shifted to the right or left with respect to the conveyance center line X while an additional image forming region is determined on the basis of image size information will be described. Similarly to the fourth embodiment, as shown in FIG. 12, between the distances HR and HL included in the left and right end information H about the image size information, the greater distance from the conveyance center line X is the distance Hmax.

The additional image producing unit 110 may add the predetermined additional image also to a region other than the region in which the desired image is formed in the direction perpendicular to the conveying direction of the recording material 11. The additional image producing unit 110 may add the predetermined additional image so that the predetermined additional image is symmetrical with respect to a conveyance center (conveyance center line X) of the recording material 11 in the direction perpendicular to the conveying direction of the recording material 11. In FIG. 12, the region surrounded by lines J1 to J4 is set on the recording material 11 as an additional image forming region. The shape of the additional image forming region shown in FIG. 12 is symmetrical with respect to the conveyance center line X. The line J1 (first line) extends in the direction perpendicular to the conveying direction of the recording material 11 and passes between the position of the frontmost end of the image (first position) and the position of the front end of the recording material 11. The line J2 (second line) extends in the direction perpendicular to the conveying direction of the recording material 11 and passes between the position of the rearmost end of the image (second position) and the position of the rear end of the recording material 11. The line J4 extends in the conveying direction of the recording material 11 and passes through a first prescribed position (fifth position) which is the same position as the position further from the conveyance center line X between the position of the rightmost end of the image and the position of the leftmost end of the image (the position of the leftmost end of the image in FIG. 12). The line J3 extends in the conveying direction of the recording material 11 and passes through a second prescribed position (sixth position) between the position of the rightmost end of the image (third position) and the position of the right end of the recording material 11. The first prescribed position and the second prescribed position are symmetrical with respect to the conveyance center line X in the direction perpendicular to the conveying direction of the recording material 11. The lines J1 to J4 may be straight lines, curves and wave lines, or combinations thereof. The line J1 may pass through the frontmost end of the image similarly to the line D1 in FIG. 7 according to the first embodiment. The line J2 may pass through the position of the rearmost end of the image similarly to the line D2 in FIG. 7 according to the first embodiment.

For example, the engine controller 100 calculates the position further from the conveyance center line X between the position of the rightmost end of the image and the position of the leftmost end of the image (the position of the leftmost end of the image in FIG. 12) on the basis of size information about the recording material 11, the conveyance center line X, and the X distance Hmax. The engine controller 100 sets a heat generating region on the basis of the position further from the conveyance center line X between the position of the rightmost end of the image and the position of the leftmost end of the image (the position of the leftmost end of the image in FIG. 12). In the example shown in FIG. 12, the heat generating blocks HB3 and HB5 corresponding to the positions shifted to the right and left ends of the recording material 11 from the conveyance center line X for the distance Hmax, and the heat generating block HB4 between the heat generating block HB3 and the heat generating block HB5 are selected. In this manner, the heat generating blocks HB3 to HB5 are selected so that the longitudinal width of the heat generating region is symmetrical with respect to the conveyance center line X.

According to the fourth embodiment, the heat generating region is set on the basis of the position further from the conveyance center line X between the position of the rightmost end of the image and the position of the leftmost end of the image. According to the fourth embodiment, the positions of the right end and the left end of the additional image forming region are determined on the basis of the heat generating region. Meanwhile, according to the fifth embodiment, the position of the rightmost end and the leftmost end of the additional image forming region is determined on the basis of one of the position of the rightmost end of the image and the position of the leftmost end of the image. More specifically, according to the fifth embodiment, the position of the rightmost end and the leftmost end of the additional image forming region is determined on the basis of the image size information. In FIG. 12, the width of the additional image is smaller than the width of the recording material 11 and smaller than the width of the heat generating region in the direction perpendicular to the conveying direction of the recording material 11.

Similarly to the fourth embodiment, the heat generating blocks are selected such that the longitudinal width of the heat generating region is symmetrical with respect to the conveyance center line X. The longitudinal width of the heat generating region is symmetrical with respect to the conveyance center line X, so that the stable runnability of the fixing film 31 can be obtained without compromising the transportability of the recording material 11. The additional image forming region according to the fifth embodiment expands wider in the direction perpendicular to the conveying direction of the recording material 11 than the additional image forming region according to the second embodiment, and the area of the additional image forming region according to the fifth embodiment is larger than the area of the additional image forming region according to the second embodiment. As a result, the readability of the additional image can be even more improved. The "symmetrically driven heat generation" as an example of the method for driving the heater 33 can also be applied to the fifth embodiment.

Sixth Embodiment

The heater 33 includes a plurality of heat generating blocks that are divided in the direction perpendicular to the conveying direction of the recording material 11 and generate heat as being supplied with power. The heat generating region can be changed by the engine controller 100 individually controlling the plurality of heat generating blocks. When the desired image has a size extending across some of the plurality of heat generating blocks and when regions in which the desired image is formed in the conveying direction of the recording material 11 are different for each of the regions corresponding to the plurality of heat generating blocks, the additional image producing unit 110 may add the predetermined additional image to each of the regions in which the desired image is formed corresponding to each of the plurality of heat generating blocks. The additional image producing unit 110 may add the predetermined additional image to only a region in which the desired image is formed corresponding to a heat generating block that includes a conveyance center (conveyance center line X) of the recording material 11, among the plurality of heat generating blocks. The additional image producing unit 110 may add the predetermined additional image to a region in which the desired image is formed corresponding to a heat generating block that includes a conveyance center (conveyance center line X) of the recording material 11, among the plurality of heat generating blocks. A method for forming an additional image according to a sixth embodiment of the invention will be described with reference to FIG. 13. According to the first to fifth embodiments, the additional image forming region is determined on the basis of the distances Vt, Vb, HR, and HL included in the image size information. This embodiment relates to a method for forming an additional image when the front and rear end information V in the image size information is applied to each of a plurality of heat generating blocks obtained by longitudinally dividing the heater 33.

Figure 13:
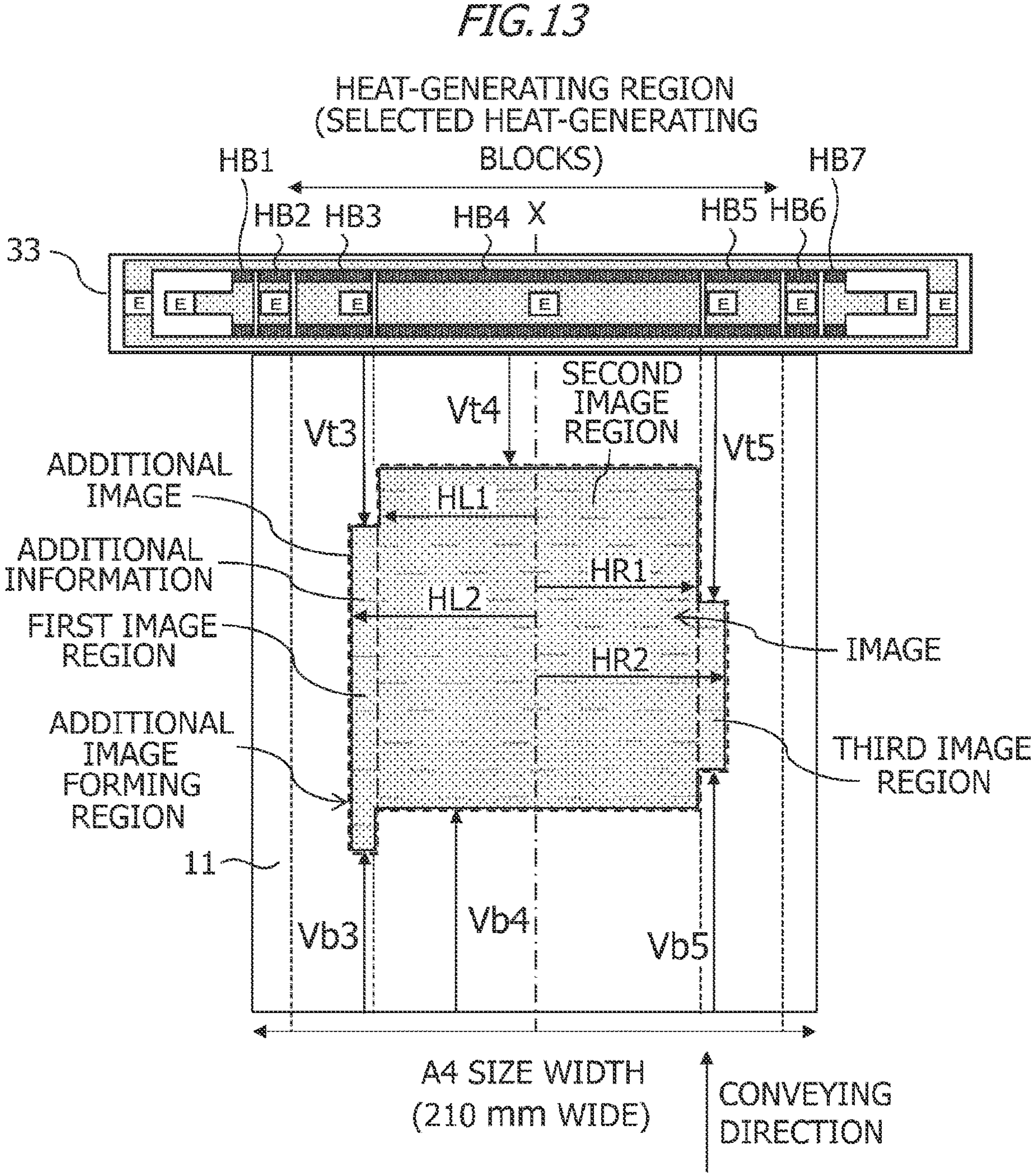
FIG. 13 is a view for illustrating a method for forming an additional image according to a sixth embodiment of the invention.

The engine controller 100 obtains distances Vt1 to Vt7 as image front end information for heat generating blocks HB1 to HB7 obtained by longitudinally dividing the heater 33. The distances Vt1 to Vt7 are the distances from the front end of the recording material 11 to the front ends of the image corresponding to the heat generating blocks HB1 to HB7. FIG. 13 shows the distances Vt3 to Vt5 corresponding to the region of the image, and the engine controller 100 obtains distances Vt3 to Vt5. The engine controller 100 obtains the distances Vb1 to Vb7 as image rear end information for the heat generating blocks HB1 to HB7. The distances Vb1 to Vb7 are the distances from the rear end of the recording material 11 to the rear ends of the image corresponding to the heat generating blocks HB1 to HB7. FIG. 13 shows the distances Vb3 to Vb5 corresponding to the region of the image, and the engine controller 100 obtains the distances Vb3 to Vb5.

The engine controller 100 obtains the distances HR1 to HR4 as image right end information and the distances HL1 to HL4 as image left end information corresponding to the heat generating blocks HB1 to HB7. The distances HR1 to HR4 are the distances from the conveyance center line X to the right ends of the image corresponding to the heat generating blocks HB4 to HB7. The distances HL1 to HL4 are the distances from the conveyance center line X to the left ends of the image corresponding to the heat generating blocks HB1 to HB4. FIG. 13 shows the distances HR1, HR2, HL1 and HL2 corresponding to the region of the image, and the engine controller 100 obtains the distances HR1, HR2, HL1 and HL2. Since the number of the heat generating blocks that are divided is not limited to the above, the image front end information, the image rear end information, the image right end information, and the image left end information are obtained according to the number of the heat generating blocks that are divided. The engine controller 100 receives the image size information including the image front end information, the image rear end information, the image right end information, and the image left end information from the external information device 200.

The engine controller 100 sets an additional image forming region on the recording material 11 on the basis of the image front end information, the image rear end information, the image right end information, and the image left end information obtained for the heat generating blocks. In this example, the additional image producing unit 110 divides the image into a plurality of image regions (first to third image regions in FIG. 13) in the direction perpendicular to the conveying direction of the recording material 11 according to the heat generating blocks HB1 to HB7 in the longitudinal direction of the heater 33. The additional image producing unit 110 sets the additional image forming region on the basis of information about the positions of the rightmost and leftmost ends of the image and information about the positions of the frontmost and rearmost ends of the plurality of image regions, and produces an additional image arranged in the additional image forming region. The frontmost end of each of the image regions is the part of the image region closest to the front end of the recording material 11. The rearmost end of each of the image regions is the part of the image region closest to the rear end of the recording material 11. The region surrounded by lines passing through the positions of the frontmost ends of the plurality of image regions, lines passing through the positions of the rearmost ends of the plurality of image regions, lines passing through the position of the rightmost ends of the image, and lines passing through the position of the leftmost ends of the image are set on the recording material 11 as the additional image forming region. The lines passing through the positions of the frontmost ends and the lines passing through the positions of the rearmost ends of the plurality of image regions extend in a direction perpendicular to the conveying direction of the recording material 11. The line passing through the rightmost position of the image and the line passing through the leftmost position of the image extend in the conveying direction of the recording material 11.

In FIG. 12, the additional image producing unit 110 superimposes the entire additional image on the entire image and arranges the additional image in the additional image forming region. A toner image corresponding to the image and the additional image is formed on the recording material 11 by the image forming unit 10. The engine controller 100 sets a heat generating region on the basis of the position of the rightmost end and the position of the leftmost end of the image. In FIG. 13, the heat generating blocks HB3 to HB5 are selected according to the set heat generating region, and the toner image on the recording material 11 is heated and fixed. In FIG. 13, the width of the additional image is smaller than the width of the recording material 11 and smaller than the width of the heat generating region in the direction perpendicular to the conveying direction of the recording material 11. The additional image producing unit 110 may add the predetermined additional image to a region in which the desired image is formed in the conveying direction of the recording material 11. The additional image producing unit 110 may add the predetermined additional image to a region in which the desired image is formed in the direction perpendicular to the conveying direction of the recording material 11.

When the region for forming the additional image is limited and set on the recording material 11 in this way, the toner image corresponding to the additional image is formed on the recording material 11 according to the size of the image. As described above, the purpose is different from the case of forming an additional image in a greater area. However, if the visibility of an additional image formed on the margin on the recording material 11 increases due to the characteristics of the image forming apparatus, it may be desirable to reduce the additional image forming region in some cases. For example, when the visibility of the additional image is enhanced by the type of the particular recording material 11 (such as glossy paper and paperboard), the additional image forming region may be set by the method according to the embodiment depending on a print mode selected for each print job.

Application Example of Sixth Embodiment

Figure 14:
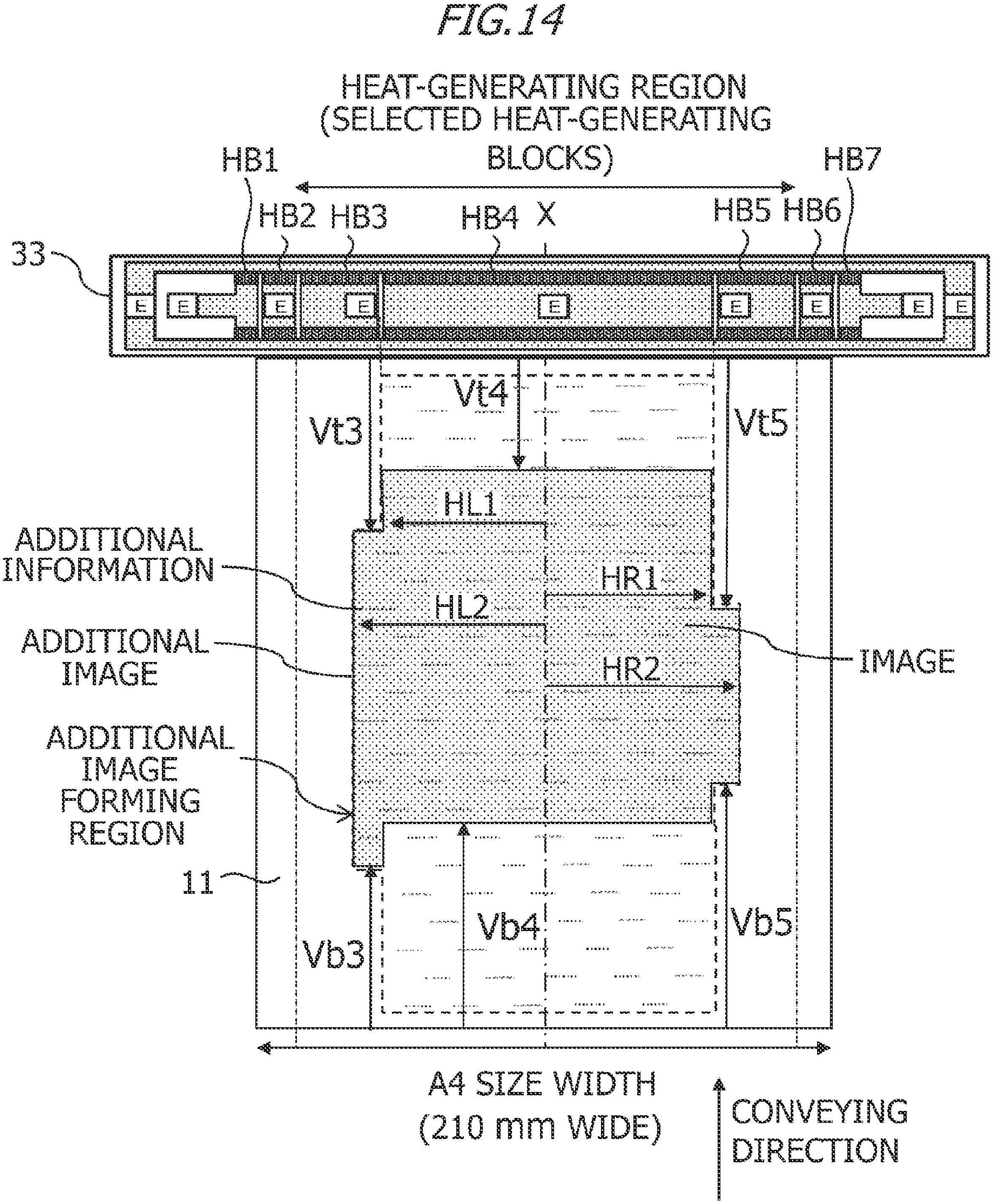
FIG. 14 is a view for illustrating the method for forming an additional image according to the sixth embodiment.

Similarly to the third embodiment, the additional image forming region may be enlarged in the widthwise direction of the recording material 11 according to the heat generating region. Similarly to the fourth embodiment, the additional image forming region may be enlarged in the widthwise direction of the recording material 11 so that the shape of the additional image forming region is symmetrical with respect to the conveyance center line X. The additional image forming region may be enlarged to the front or rear end of the recording material 11. The heat generating block HB4 in the central part of the heater 33 is likely to generate heat during almost all print jobs. Therefore, as shown in FIG. 14, the additional image forming region corresponding to the heat generating block HB4 may be enlarged to the front end and the rear end of the recording material 11. In this manner, the additional image forming region may be partially enlarged. In FIG. 14, the width of the additional image is smaller than the width of the recording material 11 and smaller than the width of the heat generating region in the direction perpendicular to the conveying direction of the recording material 11. The additional image producing unit 110 may add the predetermined additional image also to a region other than the region in which the desired image is formed in the conveying direction of the recording material 11. The additional image producing unit 110 may add the predetermined additional image to a region in which the desired image is formed in the direction perpendicular to the conveying direction of the recording material 11.

Application Examples of Embodiments

Figure 15:
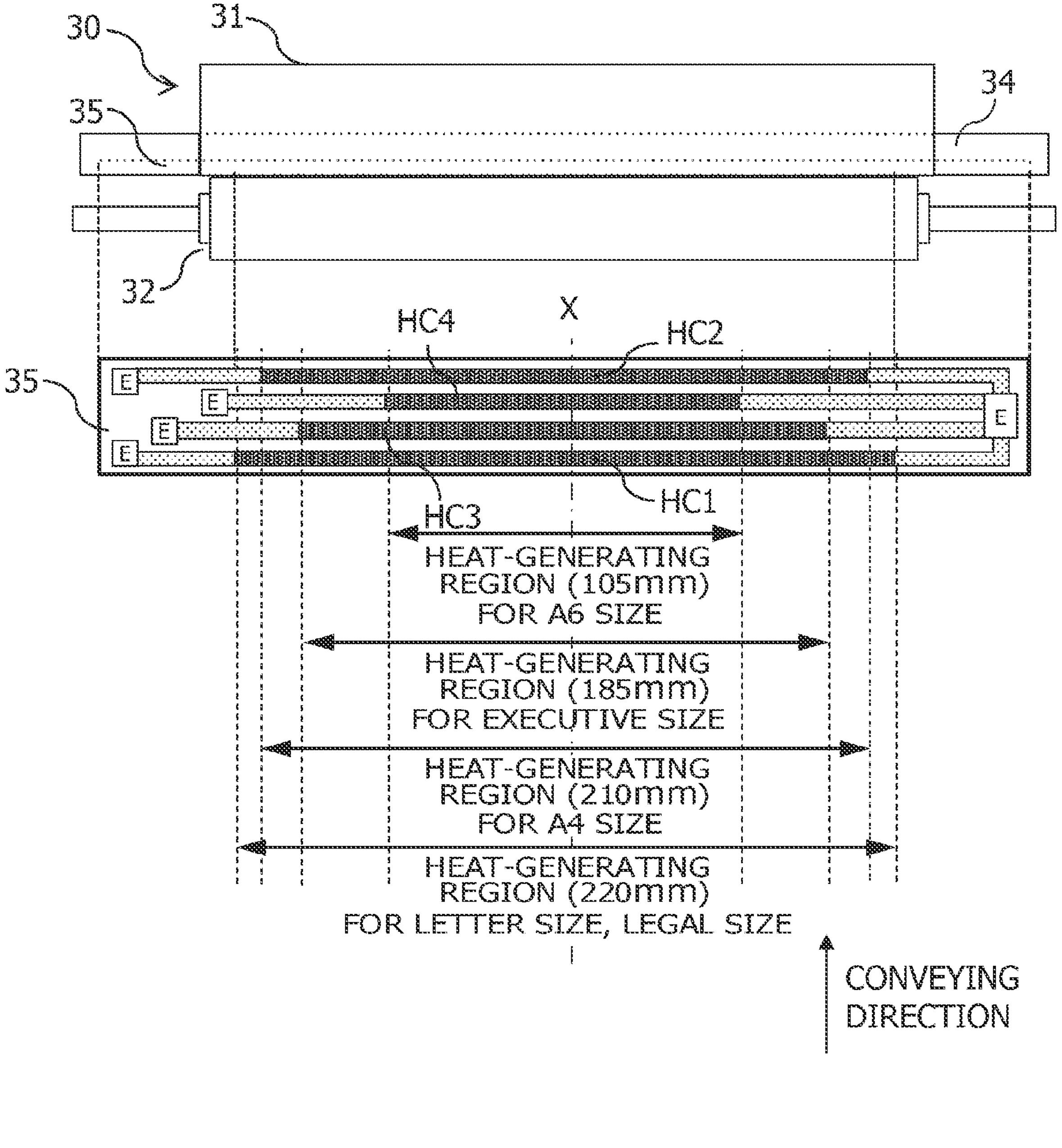
FIG. 15 is a schematic view of a heating/fixing apparatus and a heater.

The first to sixth embodiments have been described by referring to the exemplary heating/fixing apparatus 30 which has the plurality of heat generating blocks obtained by dividing the heater 33 in the longitudinal direction and capable of selectively generating heat but the embodiments are applicable to other examples of the heating/fixing apparatus 30. In particular, the first to fifth embodiments may be applied to a heating/fixing apparatus 30 as follows. An exemplary heating/fixing apparatus 30 that can be applied as an example of the embodiments is shown in FIG. 15. Since the structure other than the heater 35 in the heating/fixing apparatus 30 in FIG. 15 is the same as the structure of the heating/fixing apparatus 30 in FIG. 2, the same portions will not be described.

The heater 35 has a plurality of heat generating members HC1 to HC4 having heat generating regions having different lengths in the longitudinal direction (the direction perpendicular to the conveying direction of the recording material 11). The heat generating members HC1 to HC4 are arranged side by side in the conveying direction of the recording material 11 and the lengths of the heat generating members HC1 to HC4 are different from one another. The heat generating members HC1 to HC4 have heat generating regions as long as 220 mm, 210 mm, 185 mm, and 105 mm, respectively. The heat generating members HC1 to HC4 correspond to standardized paper sizes Letter (216 mm), A4 (210 mm), Executive (184 mm), B5 (182 mm), and A6 (105 mm). The numbers and lengths of the heat generating members are not limited to the above and may be changed arbitrarily. The heat generating members HC1 to HC4 can independently generate heat as being supplied with power independently from an electrode E connected to each of the elements. A plurality of electrodes E may be selected to cause the heat generating members HC1 to HC4 to generate heat in parallel. Using a temperature sensing element such as a thermistor (not shown) provided in a substantial center part of the heater 35, the temperature of the heat generating members HC1 to HC4 can be controlled. The engine controller 100 can change the heat generating region of the heater 35 in the longitudinal direction by selectively controlling turning on of the heat generating members HC1 to HC4. The engine controller 100 sets a heat generating region and controls the power supplied to the heater 35 so that heat generation is performed in the heat generating region of the heater 35 on the basis of the set heat generating region.

Figure 16:
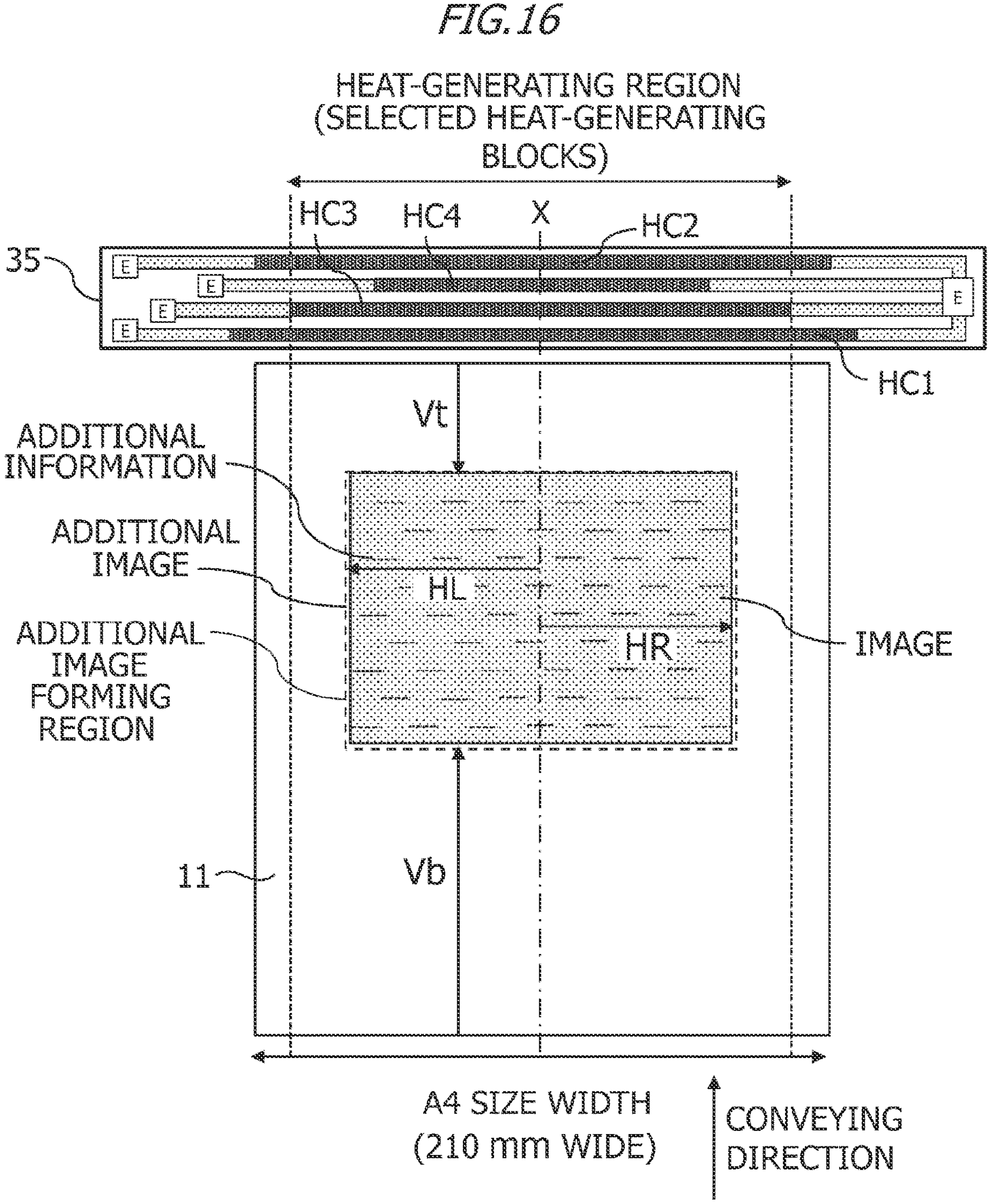
FIG. 16 is a view for illustrating a method for forming an additional image according to an application example.

Using the heater 35 in this form, a heat generating member(s) corresponding to the widthwise size of the recording material 11 may be selected to heat the recording material 11 while the heat generating member(s) may be selectively caused to generate heat corresponding to the size of the image to be printed on the recording material 11. Therefore, each of the methods for forming an additional image according to the embodiments may be applied to the application example. For example, as shown in FIG. 16, when the recording material 11 having a toner image according to an image having the same image size as that in FIG. 7 is subjected to heating and fixing, the heat generating member HC3 is selected, and power supply to the heat generating member HC3 is controlled so that the heat generating member HC3 is maintained at a target temperature. An applicable additional image forming region in this case may be set in the same manner as any of the additional image forming regions described in connection with the first to fifth embodiments. More specifically, the engine controller 100 may set an additional image forming region within the range of a rectangle determined on the basis of the distances Vt, Vb, HL, and HR obtained as image information. In FIG. 16, the width of the additional image is smaller than the width of the recording material 11 and smaller than the width of the heat generating region in the direction perpendicular to the conveying direction of the recording material 11.

Similarly to FIGS. 8 to 12, the additional image forming region may be expanded to the front and rear ends of the recording material 11 or the additional image forming region may be as large as the heat generating region corresponding to the image size. In addition, when the position of the image is shifted to the left or right from the conveyance center line X, the additional image forming region may be set so that the additional image forming region is symmetrical with respect to the conveyance center line X. The application example of the embodiments may be applied in the same manner to a heating roller type heating/fixing apparatus using, as a heater, a plurality of halogen lamps having different heat generating regions or an electromagnetic induction heating type heating/fixing apparatus when the heat generating region is changed to generate heat depending on the image size.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140047, filed on Jul. 30, 2019, which is hereby incorporated by reference herein in its entirety.

What is claimed is:

1. An image forming apparatus comprising:

a photosensitive member;

an image scanner configured to scan the photosensitive member with light according to image information;

a developing roller configured to supply toner to the photosensitive member and to form a toner image on the photosensitive member;

a fixing portion configured to fix the toner image to a recording material, the fixing portion including a heater configured to heat the toner image; and a controller configured to control the heater, wherein the controller switches a heat generating region of the heater in a longitudinal direction of the heater according to a width of a desired image in the longitudinal direction, and the controller is further configured to function as an image adding portion configured to add, to the desired image, an additional image including at least one of a manufacturer's name, a model name, a model number of the image forming apparatus, a mark, an encrypted image, a one-dimensional or two-dimensional bar code, a QR code, or an embedded image to be embedded in the desired image, wherein with respect to the longitudinal direction, a width of a region where the additional image is added by the image adding portion is variable, and wherein with respect to the longitudinal direction, the width of the region where the additional image is added is equal to or less than the width of the heat generating region, which varies with the width of the desired image.

2. The image forming apparatus according to claim 1, wherein with respect to the longitudinal direction, the width of the region where the additional image is added is equal to or less than a width a region where the desired image is formed.

3. The image forming apparatus according to claim 1, wherein with respect to the longitudinal direction, the width of the region where the additional image is added is equal to a width a region where the desired image is formed.

4. The image forming apparatus according to claim 1, wherein the image adding portion adds the additional image also to a region other than the region in which the desired image is formed in the longitudinal direction.

5. The image forming apparatus according to claim 1, wherein the heater includes a plurality of heat generating blocks arranged in the longitudinal direction and generate heat independently of each other, and the controller switches the heat generating region by controlling the plurality of heat generating blocks.

6. The image forming apparatus according to claim 1, wherein the heater includes a plurality of heat generating members arranged side by side in a conveying direction and having different widths in the longitudinal direction, and the controller switches the heat generating region by selectively controlling energizing of the plurality of heat generating members.

7. The image forming apparatus according to claim 1, wherein the fixing portion includes a tubular film configured to be in contact with the recording material, and the heater is provided in an inner space of the film.

8. The image forming apparatus according to claim 7, wherein the fixing portion includes a roller configured to form a fixing nip portion for conveying the recording material together with the heater through the film.

9. An image forming apparatus comprising:

a photosensitive member;

an image scanner configured to scan the photosensitive member with light according to image information;

a developing roller configured to supply toner to the photosensitive member and to form a toner image on the photosensitive member;

a fixing portion configured to fix the toner image to a recording material, the fixing portion including a heater configured to heat the toner image; and a controller configured to control the heater, wherein the controller switches a heat generating region of the heater in a longitudinal direction of the heater according to a width of a desired image in the longitudinal direction, and the controller is further configured to function as an image adding portion configured to add, to the desired image, an additional image including at least one of a manufacturer's name, a model name, a model number of the image forming apparatus, a mark, an encrypted image, a one-dimensional or two-dimensional bar code, a QR code, or an embedded image to be embedded in the desired image, wherein with respect to the longitudinal direction, a width of a region where the additional image is added by the image adding portion is variable, and wherein with respect to the longitudinal direction, the width of the region where the additional image is added is equal to or less than a width of a region where the desired image is formed.

10. The image forming apparatus according to claim 9, wherein the heater includes a plurality of heat generating blocks arranged in the longitudinal direction and generate heat independently of each other, and the controller switches the heat generating region by controlling the plurality of heat generating blocks.

11. The image forming apparatus according to claim 9, wherein the heater includes a plurality of heat generating members arranged side by side in a conveying direction and having different widths in the longitudinal direction, and the controller switches the heat generating region by selectively controlling energizing of the plurality of heat generating members.

12. The image forming apparatus according to claim 9, wherein the fixing portion includes a tubular film configured to be in contact with the recording material, and the heater is provided in an inner space of the film.

13. The image forming apparatus according to claim 12, wherein the fixing portion includes a roller configured to form a fixing nip portion for conveying the recording material together with the heater through the film.

14. An image forming apparatus comprising:

a photosensitive member;

an image scanner configured to scan the photosensitive member with light according to image information;

a developing roller configured to supply toner to the photosensitive member and to form a toner image on the photosensitive member;

a fixing portion configured to fix the toner image to a recording material, the fixing portion including a heater configured to heat the toner image; and a controller configured to control the heater, wherein the controller switches a high-heat-generating-region of the heater in a longitudinal direction of the heater according to a width of a desired image in the longitudinal direction, and the controller is further configured to function as an image adding portion configured to add, to the desired image, an additional image including at least one of a manufacturer's name, a model name, a model number of the image forming apparatus, a mark, an encrypted image, a one-dimensional or two-dimensional bar code, a QR code, or an embedded image to be embedded in the desired image, wherein with respect to the longitudinal direction, a width of a region where the additional image is added by the image adding portion is variable, and wherein with respect to the longitudinal direction, the width of the region where the additional image is added is equal to or less than the width of the high-heat-generating-region, which varies with the width of the desired image.

15. The image forming apparatus according to claim 14, wherein the heater includes a plurality of heat generating blocks arranged in the longitudinal direction and generate heat independently of each other, and the controller switches the high-heat-generating-region by controlling the plurality of heat generating blocks.

16. The image forming apparatus according to claim 14, wherein the heater includes a plurality of heat generating members arranged side by side in a conveying direction and having different widths in the longitudinal direction, and the controller switches the high-heat-generating-region by selectively controlling energizing of the plurality of heat generating members.

17. The image forming apparatus according to claim 14, wherein the fixing portion includes a tubular film configured to be in contact with the recording material, and the heater is provided in an inner space of the film.

18. The image forming apparatus according to claim 17, wherein the fixing portion includes a roller configured to form a fixing nip portion for conveying the recording material together with the heater through the film.

* * * * *